US010439411B2

(12) United States Patent
Narayanasamy et al.

(10) Patent No.: US 10,439,411 B2
(45) Date of Patent: Oct. 8, 2019

(54) METHOD AND APPARATUS FOR BATTERY CONNECTION BY MAGNETIC MEANS

(71) Applicants: Lydia Ranjini Narayanasamy, Hanover, MD (US); Dorothy Devine Burdine, Ardmore, TN (US); Robert Van Burdine, Ardmore, TN (US)

(72) Inventors: Lydia Ranjini Narayanasamy, Hanover, MD (US); Dorothy Devine Burdine, Ardmore, TN (US); Robert Van Burdine, Ardmore, TN (US)

(*) Notice: Subject to any disclaimer, the term of this patent is extended or adjusted under 35 U.S.C. 154(b) by 366 days.

(21) Appl. No.: 15/143,556

(22) Filed: Apr. 30, 2016

(65) Prior Publication Data
US 2017/0317444 A1    Nov. 2, 2017

(51) Int. Cl.
H02J 7/00         (2006.01)
H01R 13/62        (2006.01)
H01R 35/04        (2006.01)

(52) U.S. Cl.
CPC ........ *H02J 7/0045* (2013.01); *H01R 13/6205* (2013.01); *H02J 7/0044* (2013.01); *H01R 35/04* (2013.01); *H02J 7/0068* (2013.01)

(58) Field of Classification Search
None
See application file for complete search history.

(56) References Cited

U.S. PATENT DOCUMENTS

| | | | |
|---|---|---|---|
| 4,204,438 A | 5/1980 | Binaris et al. | |
| 4,609,238 A | 9/1986 | Jamgotchian | |
| 4,917,612 A | 4/1990 | Priest | |
| 5,242,440 A * | 9/1993 | Shippert | A61B 17/00 200/DIG. 2 |
| 6,550,356 B1 | 4/2003 | Underwood | |
| 7,442,042 B1 | 10/2008 | Lewis | |
| 7,897,277 B2 | 3/2011 | Meyer et al. | |
| 8,228,666 B2 | 7/2012 | Rickard | |
| 8,758,025 B1 | 6/2014 | Liljegren et al. | |
| 9,088,097 B2 | 7/2015 | Kim et al. | |
| 9,142,912 B1 | 9/2015 | Allen | |
| 9,142,913 B2 | 9/2015 | Buelow | |
| 9,254,376 B2 | 2/2016 | Colton et al. | |
| 2012/0206088 A1* | 8/2012 | Park | H02J 7/00 320/106 |
| 2012/0206090 A1* | 8/2012 | Hyun-Jun | H02J 50/10 320/107 |

* cited by examiner

*Primary Examiner* — David V Henze-Gongola

(57) ABSTRACT

A self-aligning magnetic coupling system provides a mechanically moveable electrical connection for an electrical power source to include a battery or plurality of batteries comprising a battery pack and associated connectivity and controls, and magnetically facilitated power coupling to an appliance. Flexible magnetic electrical conductors and connectors provide mechanical and electrical connection of the electrical power source to an appliance such as a tattoo machine.

20 Claims, 40 Drawing Sheets

METHOD AND APPARATUS FOR BATTERY CONNECTION BY MAGNETIC MEANS

FIELD OF THE INVENTION

The present invention relates to magnetic electrical conductors and connectors, and in particular to the mechanical and electrical connection of a battery electrical power source to an appliance to include a tattoo machine. The present invention embodies a self-aligning magnetic coupling system providing a mechanically flexible but controlled electrical connection for a battery, together with a battery or plurality of batteries comprising a battery pack and associated connectivity and controls, and magnetically facilitated power coupling to an appliance.

SUMMARY OF THE INVENTION

The present invention reveals a battery connection method facilitating rapid battery exchange. No cabling is involved with mechanical connection and electrical conduction being provided by magnetic attraction of conductors, including the attachment and mechanical support of the battery. It further provides for reversibility of the battery connection eliminating any possibility of reversed polarity during attachment. It further reveals means for the connection of conductors via magnetic attraction.

The present invention provides for self-alignment of the magnetic conductive connectors without the requirement for springs or other mechanical implements. It incorporates the retention of the conductive magnetic connector allowing limited but sufficient movement for self-alignment.

Further, the present invention facilitates the relief of side loading forces as the magnetic connector has limited freedom of motion without losing electrical contact or mechanical retention.

Unless otherwise defined, all terms (including trade, technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art, and should not be interpreted in an idealized or overly formal sense unless expressly so defined herein. Well-known functions or constructions may not be described in detail for brevity and/or clarity.

The present invention relates to magnetic electrical conductors and connectors, and in particular to the mechanical and electrical connection of a battery electrical power source to an appliance and associated electrical controls. The present invention embodies a self-aligning magnetic coupling system providing a flexible connection for a battery, together with a battery comprising a battery pack, and magnetically assisted power coupling to an appliance.

In this manner herein revealed a battery back may be readily exchanged in a self-aligning manner providing both robust and mechanically tolerant connection.

DISCUSSION OF THE PRIOR ART

U.S. Pat. No. 9,254,376 teaches a wireless, cordless or non-tethered tattooing apparatus that employs the use of batteries and a stable voltage regulator to provide a stable control of the operation of the tattoo applicator.

It further teaches that the oscillation frequency has been previously provided by using a stabilized voltage source that is fed to the tattoo gun from an external voltage supply through one or more wires. The current generation of tattoo machines is moving towards a wireless or non-connected type of arrangement. However, the typical wireless tattoo mechanisms on the market are either too unsanitary and/or have too much extra weight resulting in an artist having to struggle while creating a tattoo or experiencing fatigue. There are numerous problems with existing wireless tattoo applicators. For instance, employing inefficient voltage conversion technology has resulted in using oversized batteries resulting in too much weight in the tattoo apparatus. In addition, the lack of universal compatibility has resulted in creating a sanitation issue in that a voltage controller which is used with a possibly infected glove may be used numerous times throughout the process of a tattoo. Another issue relates to the inconsistency of power and/or frequency used to control the tattoo gun.

The present invention provides for the rapid removal and replacement of a battery to an appliance, including an appliance such as a tattoo machine, herein interchangeably referred to as a tattoo gun. In the case of a tattoo machine the present invention provides for the convenient removal of a spent battery pack and the rapid insertion of a fresh battery pack. The removal of the of the spent battery pack, the insertion and retention of the new battery pack being facilitated by magnetic means incorporating electrical conduction, and further by the mechanical provision of degrees of freedom of motion or the battery pack relieving mechanical connection stresses and assuring continuous and assured electrical connection during operation of a powered device such as a tattoo machine.

The present invention provides a battery back with a flexible but fixed electrical and mechanical connection means allowing limited mechanical motion of the battery pack without mechanical tension on the electrical connection preventing loss of electrical contact. In the case of a tattoo machine or any other hand held power tool the battery pack of the present invention may be mounted on a movable surface such as the wrist. In this manner the battery moves with the body without undue stress on the magnetic mechanical connection maintaining uninterrupted electrical connection.

As the battery pack of the present invention can be readily replaced at any time without significant interruption of the tattoo session the provision of a lightweight battery pack is provided. In this manner the artist is neither unduly burdened with battery weight or short battery life.

The present invention further provides voltage regulation at a selectable and regulated level through means typical of the art.

Sterility being a major concern of the tattoo artist, the battery pack of the present invention is both coverable and washable eliminating cross contamination concerns. Incorporation of sterilization via the provision of Ultraviolet Light and/or Ozone gas to the battery pack during the charging cycle provides enhanced assurance of cross contamination avoidance.

U.S. Pat. No. 9,142,913 teaches a magnetically connected universal computer power adapter. The disclosed power adapter provides a power supply, a power cord, a cord connector, and a charging plug. The cord connector and charging plug each contain a magnet that magnetically couples the cord connector to the charging plug.

A method is disclosed of charging an electrical device, comprising: a) inserting a tip of a connection plug, which includes a plug connection face, into a power socket of the electrical device; b) positioning the plug connection face proximate to a cord connection face that is one piece with a power cord; c) aligning plug connection points in the plug connection face, which are electrically connected to the tip, with cord connection points in the cord connection face, wherein the plug connection face and the cord connection face each contain a magnet, the two magnets being of opposite polarity; d) holding the plug connection points in contact with corresponding cord connection points by magnetic attraction between the magnets; and e) supplying power to the power socket of the electrical device through the power cord, the cord connection points, the plug connection points, and the tip. Reversibility of the power cord connection is provided eliminating the possibility of misinsertion of the power cable.

The present invention teaches a battery connection method facilitating rapid battery exchange. No cabling is involved with mechanical connection and electrical conduction being provided by magnetic attraction of conductors, including the attachment and mechanical support of the battery. It further provides for reversibility of the battery connection eliminating any possibility of reversed polarity during attachment.

The present invention provides for self alignment of the magnetic conductive connectors without the requirement for springs or other mechanical implements. It incorporates the retention of the conductive magnetic connector allowing limited but sufficient movement for self alignment. Further, the present invention facilitates the relief of side loading forces as the magnetic connector has limited freedom of motion without loosing electrical contact or mechanical retention.

U.S. Pat. No. 9,142,912 teaches a metal conductive housing surrounding connecting magnets providing electrically conductive connections for wires forming jumper cables. It describes a set of magnetic jumper cables, comprising: two lengths of elongate, insulated, electrically-isolated electric conductors; and magnetic couplers configured in electrical connection with at least one end of each of the two lengths of elongate, insulated, electric conductor, wherein an individual magnetic coupler includes: an insulative material, and a magnetic element, wherein the magnetic element is positioned within the insulative material such that the magnetic element is in electrical connection with the elongate, insulated, electrically-isolated electric conductor, further wherein north magnetic poles of each of the magnetic elements of the magnetic couplers are exposed at a first surface of the insulative material, and further wherein south magnetic poles of each of the magnetic elements of the magnetic couplers are not covered by the insulative material but are indented back from an opposing second surface of the insulative material.

The present invention provides for the electrical connection and mechanical support of a battery through the electrically conductive plating on the attractive magnets and for a captured conductive surface between the coupling magnets insuring proper alignment and electrical conduction. No cabling is involved or supported. Further, the present invention embodies the forming of polarity in the north and south alternating magnetic fields facilitating the natural attraction of the magnetic fields. The magnets on either side of the battery connection need to be of proper polarity to attract and may all be of the same polarity or be reversed or alternated in respect to each other so as to attract or repel as per the desired operation with or without the requirement for insulating material between the conductors.

U.S. Pat. No. 9,088,097 teaches a magnetic connector module including a power supply blocking circuit, comprising: a pattern electrode part module; and a pin terminal part module, wherein the pattern electrode part module includes pattern electrodes having a concentric circle shape, pattern electrode part magnets, and a pattern electrode part connector, wherein the pin terminal part module includes a plurality of pin terminals, pin terminal part magnets, and a pin terminal part connector, wherein the pattern electrode part magnets and the pin terminal part magnets are magnetically coupled to each other to allow the pattern electrodes and the plurality of pin terminals to contact each other, wherein the plurality of pin terminals include a power terminal VCC, a ground power terminal GND, and a signal terminal S, wherein an electrode contacting the ground power terminal GND and an electrode contacting the signal terminal S among the pattern electrodes are electrically short-circuited, and wherein the pin terminal part module includes the power supply blocking circuit allowing power supply to the power terminal VCC only in a state in which the ground power terminal GND and the signal terminal S are electrically short-circuited.

The present invention provides for the electrical connection and mechanical support of a battery through the electrically conductive plating on the attractive magnets proving a captured conductive surface between the coupling magnets insuring proper alignment and electrical conduction. The present invention further reveals the connection of a battery to another battery or batteries forming a power source magnetically connected and supported via mechanical means simultaneously providing electrical conduction and polarity control. No extension cabling is involved or supported. Further, the present invention embodies the forming of polarity in the north and south alternating magnetic fields facilitating the natural attraction of the magnetic fields. The magnets on either side of the battery connection need to be of proper polarity to attract and may all be of the same polarity or be reversed or alternated in respect to each other so as to attract or repel as per the desired operation with or without the requirement for insulating material between the conductors.

U.S. Pat. No. 8,758,025 teaches a power cable system comprising: a cable for connection to a power source; a connector electrically connected and mechanically coupled to the cable, comprising: a connector body mechanically coupled to the cable; a pair of connector magnets spaced apart from each other by a first distance and mechanically coupled within the connector body; a pair of connector terminals, each of the pair of connector terminals being positioned between the pair of connector magnets, the pair of connector terminals being electrically connected to the cable; a connector backing plate magnetically coupled to the pair of connector magnets; and a receptacle electrically connected and mechanically coupled to a device, the receptacle comprising: a pair of receptacle magnets positioned within the device and spaced apart from each other at a second distance about equal to the first distance, the pair of receptacle magnets having a first magnetic polarity that opposes a second magnetic polarity of the pair of connector magnets such that the pair of receptacle magnets is configured to magnetically couple with the pair of connector magnets when brought within proximity of each other; a pair of receptacle terminals, each of the pair of receptacle terminals being positioned between the pair of receptacle magnets, the pair of receptacle terminals being configured to mate with the pair of connector terminals to form an electrical connection; and a receptacle backing plate attached to the pair of receptacle magnets.

The present invention provides for the electrical connection and mechanical support of a battery through the electrically conductive plating on the attractive magnets providing a captured conductive surface between the coupling magnets insuring proper alignment and electrical conduction. The present invention further reveals the connection of a battery to another battery or batteries forming a power source magnetically connected and supported via magnetic mechanical means simultaneously providing electrical conduction and polarity control. No extension cabling is involved or supported. Further, the present invention embodies the forming of polarity in the north and south alternating magnetic fields facilitating the natural attraction of the magnetic fields. The magnets on either side of the battery connection are preferred to be of proper polarity to attract and may all be of the same polarity or be reversed or alternated in respect to each other so as to attract or repel as per the desired operation with or without the requirement for insulating material between the conductors. Further, the present invention provides conductive surfaces on the magnets assuring mechanical and electrical contact. The present invention further provides mechanical flexibility between the magnetic and electrical connectors assuring electrical contact by mitigating minor alignment or mechanical stress promoting contact issues.

U.S. Pat. No. 8,228,666 teaches a battery powered portable system of operating a tattoo gun where the battery can be worn on the user's arm or clipped to the user's belt. The system directly connects to conventional tattoo guns, and offers the options of utilizing a fingertip control of the machine's speed and ON/OFF functions or the conventional control module and foot pedal controls.

In terms of a tattoo machine or any hand held battery operated tool the present invention provides for a battery powered portable system of operating the tool where the battery and associated controls can be worn on the user's wrist or any part of the users body or clothing, the battery connecting via conductive magnetic means that further facilitate mechanical motion reducing or eliminating mechanical stress on the electrical connection. The present invention further provides for the electrical connection and mechanical support of a battery through the electrically conductive plating on the attractive magnets providing a captured conductive surface between the coupling magnets insuring proper alignment and electrical conduction. The present invention further reveals the connection of a battery to another battery or batteries forming a power source magnetically connected and supported via mechanical means simultaneously providing electrical conduction and polarity control. Further, the present invention embodies the forming of polarity in the north and south alternating magnetic fields facilitating the natural attraction of the magnetic fields. The magnets on either side of the battery connection need to be of proper polarity to attract and may all be of the same polarity or be reversed or alternated in respect to each other so as to attract or repel as per the desired operation with or without the requirement for insulating material between the conductors. Further the present invention provides conductive surfaces on the magnets assuring mechanical and electrical contact. The present invention further provides mechanical flexibility of the magnetic electrical connectors assuring electrical contact by mitigating minor alignment or mechanical contact issues.

U.S. Pat. No. 7,897,277 teaches a reversible battery cartridge, comprising: a first region that receives a primary battery; a second region opposite the first region that receives a secondary battery; and first, second, and third electrical contacts, wherein the first and the second electrical contacts electrically communicates with the primary battery inserted in the first region and the second and third electrical contacts electrically communicates with the secondary battery inserted in the second region. It fails to teach a magnetically coupled cartridge where the connection may move mechanically but be physically restrained providing assured electrical connectivity. It also fails to teach allowed motion of the battery pack, or magnetic retention of the battery pack.

The present invention reveals a method and means of mechanically securing a battery or battery pack further providing a means of transferring electrical charge comprising the attachment of a magnetic electrically conductive connector directly to a contact of a source, the magnetic connector being mechanically retained by magnetic means with an allowed motion attaching a second magnetic connector directly to a second contact of an electrical source or sink.

U.S. Pat. No. 7,442,042 teaches a magnetic clip cord for a tattoo machine that comprises a pair of magnet bars, in which one magnet bar is mounted to an electrical cord and the other magnet bar is mounted on the frame of a tattoo machine. The invention is used by aligning the two magnets bar, and allowing the magnetic force to connect the two pieces, upon which a positive current will pass along to a tattoo machine when in use.

The present invention facilitates complete reversibility of the magnetically polarized electrical connection with assuring correct electrical connection at all times in any orientation as it is reversible. The present invention assures contact of the magnetic conductors by separating them with a structural but flexible connective material assuring complete electrical contact at all times.

U.S. Pat. No. 6,550,356 teaches a composite battery-integrated tattooing machine totally avoids a clip cord and the drag associated with it. The machine comprises a base frame for removably holding a needle bar housing assembly, a tattoo needle assembly removably mounted to reciprocate within the needle bar housing, a reciprocating motion generator having at least one electromagnet and a make and break mechanism for effecting reciprocating motion of the tattoo needle assembly, a battery, a rheostat, and a switch for actuation of the reciprocating motion of the tattoo needle assembly. Experts can now tattoo without the annoying drag of a clip cord.

Mounting the battery on the tattoo machine or any power tool adds weight and complexity to the power tool. This weight must be supported and moved with the tool during use. The present invention provides for the flexible magnetic connection of the battery in a multiplicity of configurations, including attachment to the wrist further facilitating electrical connection to the tool via a short electrical connector and the convenience of electrical controls being available at the battery at all times.

U.S. Pat. No. 4,917,612 teaches a connector for electrically connecting an electrical lead to a terminal of a battery includes a mounting member and a contact member. The mounting member is either connectable to or integral with a terminal post of a battery and includes a mounting magnetic section and an electrical conductor between the battery terminal and the contact member. The contact member is connectable to an electric lead and includes a contact magnetic section coupled with the mounting magnetic section to connect the contact member to the mounting member. Electricity is conducted from the battery terminal to the electric lead via the electrical conductive section and the magnetic sections are outside the major electrical conductive route so that the magnetic sections at least partially insulate the electrical conductive sections. U.S. Pat. No. 4,609,238 teaches a pair of generally parallel, electrically conductive and ferrous material plates are provided and permanent magnets structure is sandwiched between the plates. An elongated electrically conductive threaded fastener includes a portion thereof projecting outwardly from the side of one of the plates remote from the other plate and may be anchored within an endwise outwardly opening bore formed in a recessed battery post.

The present invention integrates the magnetic and conductive functions and is further integrated with the battery pack forming a single unit providing a connectable battery function that is mechanically supported by the magnetic action of the electrically connecting element. Mechanical flexibility is provided relieving stress on the conductive connective magnets facilitating incidental motion of the battery relative to the connector.

U.S. Pat. No. 4,204,438 teaches a battery powered tattooing device is provided which includes a motor housing and a needle housing secured thereto. A motor and an eccentric drive structure driven by the motor are mounted in the motor housing.

The present invention provides a battery that is not integrated into the tattoo machine housing, but is integrated into the function being performed by the user. Mounting the battery on the tattoo machine or any power tool adds weight and complexity to the power tool. This weight must be supported and moved with the tool during use. The present invention provides for the flexible magnetic connection of the battery in a multiplicity of configurations, including attachment to the wrist further facilitating electrical connection to the tool via a short electrical connector and the convenience of electrical controls being available at the battery at all times. The present invention further integrates the magnetic and conductive functions and is further integrated with the battery pack forming a single unit providing a connectable battery function that is mechanically supported by the magnetic action of the electrically connecting element. Mechanical flexibility is provided relieving stress on the conductive connective magnetics facilitating incidental motion of the battery relative to the connector.

The following disclosure relates to a magnetic connector and controller for a battery and pertains to magnetic coupling systems providing both fixed and flexible mechanical connection and electrical conduction for a battery and battery arrays and the connection means thereof.

These and other aspects, features and embodiments of the present invention are more fully described in the detailed description and illustrated in the figures.

BRIEF DESCRIPTION OF THE DRAWINGS

The invention will now be described by way of example only, with reference to the accompanying drawings in which.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention relates to the mechanical connection of conductive elements through the action of integrated magnetic elements and associated controls. In particular to the conduction of electrical current via conductors brought into mechanical contact by said integrated magnetic elements.

Figure 1:
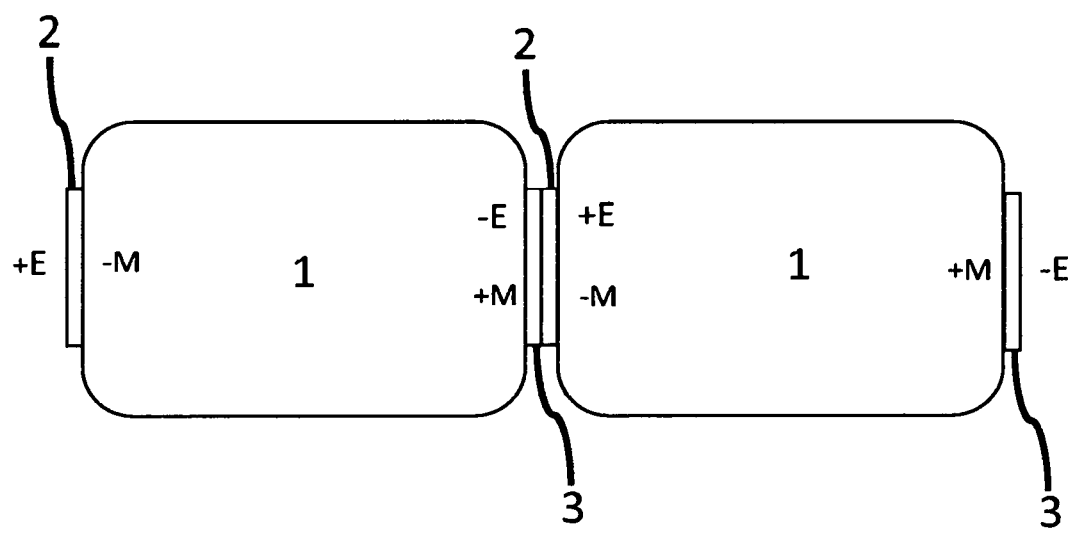
FIG. 1 represents two current sources such as batteries with mechanical and electrical contact being made and maintained through the magnetic action of electrically conductive magnets.

FIG. 1 illustrates two current sources 1 such as cylindrical batteries brought into electrical contact through the action of electrically conductive magnets 2 and 3 each in electrical contact with a selected electrical pole of the current source 1. The current sources 1 are mechanically joined together through the magnetic action of magnets 2 and 3. Magnetics 2 and 3 are mounted with opposing magnetic polarities facing away from the current source 1, and each magnetic polarity being electrically connected to a selected and consistent electrical polarity. In this manner the magnets 2 and 3 magnetically attract and attach to the correct electrical pole.

Magnets 2 and 3 are mounted such that the magnetic pole is selected for a particular electrical battery polarity. One magnetic pole of each magnet 2 and 3 is covered by the battery being next to the battery, while the other and opposite pole is exposed away from the battery to facilitate mechanical attachment. Magnets 2 and 3 are housed in an electrically conductive medium present on their contacting surfaces and cause said electrical mediums to mechanically contact each other by being pressed together by the magnetic attraction between the opposite magnetic poles. For example, the magnetic plus polarity designated as M plus herein taken as the north magnetic pole polarity of the shown magnets 3 are shown as electrically connected to the battery electrical polarity E minus, or negative. The magnetic negative polarity designated as M minus herein taken as south magnetic pole polarity of the magnets 2 are shown as electrically connected to the battery electrical polarity E plus, or positive. In this manner the battery electrical poles are drawn together to form a complementary battery stack as is common in battery powered devices. The selection of magnetic or electrical polarities may be reversed or exchanged as long as the desired battery configuration is realized. Magnetic poles are related to the associated electrical polarity accommodating correct electrical polarities for the desired battery action. Additional current sources so equipped with electrically conductive magnets 2 and 3 may be attached to achieve the desired total voltage level by summing of the voltage of the multiple current sources 1. In this manner many current sources such as batteries may be accommodated forming the desired power supply.

Figure 2:
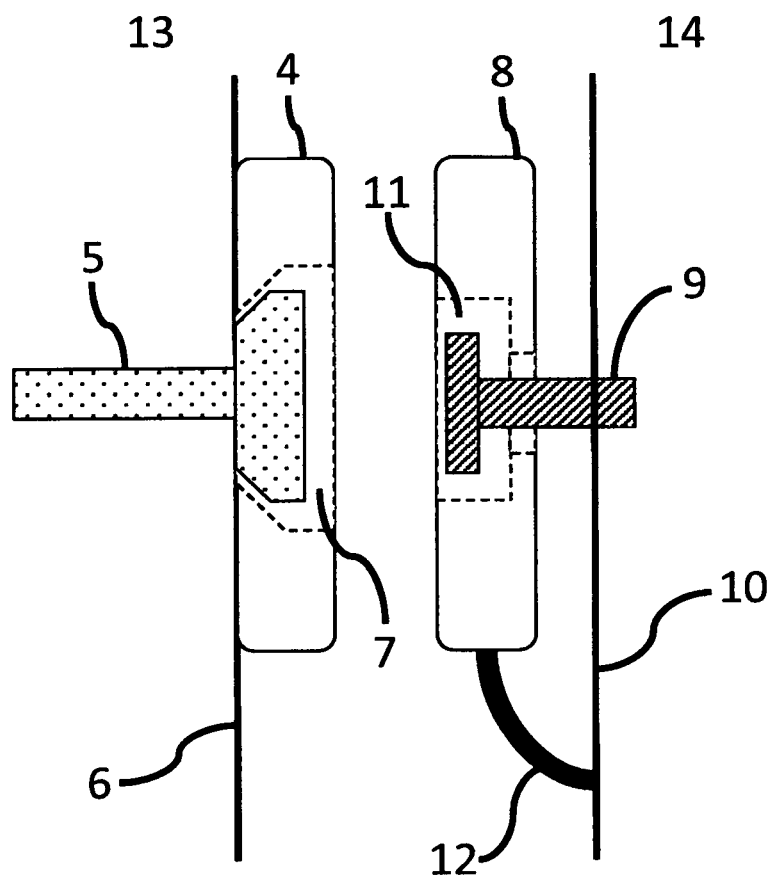
FIG. 2 represents the mechanical connection of both a fixed and movable electrically conductive magnet of the present invention.

FIG. 2 illustrates a fixed conductive magnet 4 is shown firmly connected by fastener 5 to a structural substrate 6. Structural substrate 6 may be selected as electrically conductive, insulated; or facilitating electrically conductive means. The fixed conductive magnet 4 is shown formed with a cavity 7 so as to accommodate fastener 5 attaching fixed conductive magnet 4 to substrate 6 without interfering with the mechanical and electrical contact of fixed conductive magnet 4 to floating conductive magnet 8 by magnetic means. Fastener 5 is structural and may also be electrically conductive further facilitating the transfer of electrical energy.

Floating conductive magnet 8 is shown being electrically connected via flexible electrical conductor 12 to an electrically conductive and mechanically connective structural substrate 10. The motion of magnet 8 is retained and constrained by fastener 9 and the mechanical interaction of fastener 9 and formed cavity 11. Fastener 9 allows the mechanical motion of magnet 8 as defined by the length and shape of fastener 9 in relation to the formed cavity 11 in magnet 8. Formed cavity 11 simultaneously facilitates and limits the aforesaid mechanical motion and provides for the mechanical retention of magnet 8. Fastener 9 is structural and may also be electrically conductive further facilitating the transfer of electrical energy. Structural substrate 10 may be selected as electrically conductive, non-conductive or facilitating electrically conductive means.

The floating conductive magnet 8 is allowed to move along and be retained by fastener 9. Formed cavity 11 in magnet 8 simultaneously defines the limits of motion of magnet 8 in both the lateral, as in back and forth, and angular, as in other than parallel to structural substrate 10. Floating conductive magnet 8 facilitates motion and angular contact in reference to fixed conductive magnet 4, facilitating the making and maintaining of both mechanical and electrical contact when structural substrates 6 and 10 are parallel or at a relative angle to each other.

When conductive magnets 4 and 8 are allowed to mechanically contact each other through magnetic action a conductive channel is formed through fastener 5, fixed conductive magnet 4, floating conductive magnet 8, mechanically flexible electrical conductor 12, electrically conductive fastener 9, and conductive structural substrate 10. Conductive magnets 4 and 8 are arranged so as to magnetically attract each other to connect the positive to the negative electrical poles of the battery, and repel each other when like electrical poles are brought near each other assuring an electrically correct battery orientation for typical battery operation. Structural substrates 6 and 10 may be selected to be structural only or both conductive and structural.

Hereinafter, the fixed conductive magnet 13 is the selective grouping of subcomponents 4, 5, 6 and 7. The movable conductive magnet 14 is the selective grouping of subcomponents 8, 9, 10, 11 and 12.

In all further embodiments herein disclosed, the use of fixed conductive magnet 13 and/or movable conductive magnet 14 are interchangeable and mutually substitutable to address the preferred configuration and application.

Figure 3:
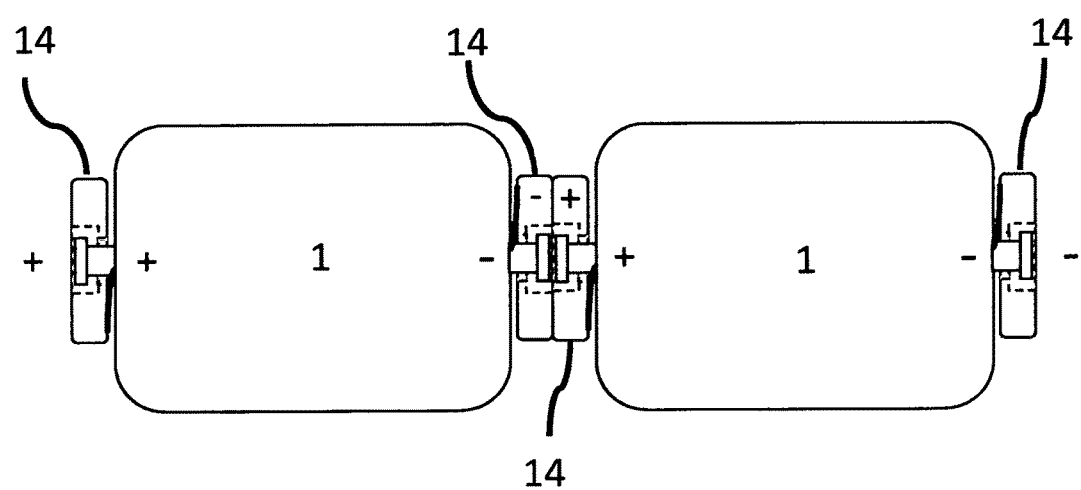
FIG. 3 represents two current sources such as batteries with mechanical and electrical contact being made and maintained through the magnetic action of electrically conductive magnets that are mounted to allow restricted motion of the batteries.

FIG. 3 reveals two current sources 1 such as cylindrical batteries shown brought into electrical and mechanical contact through the magnetic mechanical attractive action of movable conductive magnets 14 each in electrical contact with a selected pole of the current source as shown by the + (plus) and − (minus) designations. Magnetic poles are related to the associated electrical polarity accommodating correct electrical polarities for the desired battery action. Additional current sources so equipped with movable electrically conductive magnets 14 may be attached to achieve the desired total voltage level by summing of the voltage of the multiple current sources 1. In this manner many current sources such as batteries may be accommodated forming the desired power supply.

Figure 4:
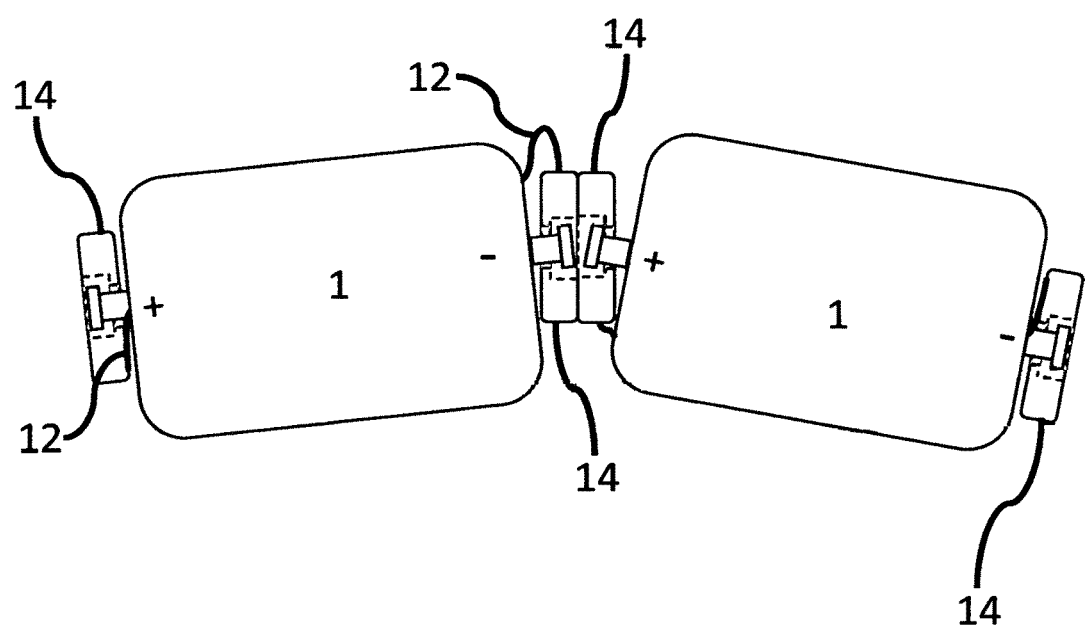
FIG. 4 represents two current sources such as batteries with mechanical and electrical contact being made and maintained through the magnetic action of electrically conductive magnets that are mounted to allow restricted motion of the batteries that are floating with respect to each other and other electrical and mechanical contacts while maintaining electrical connection.

FIG. 4 illustrates two current sources 1 such as cylindrical batteries are shown being brought into electrical contact through the magnetic mechanical attractive action of movable conductive magnets 14 each in electrical contact with a selected pole of the current source as shown by the + (plus) and − (minus) designations. The moveable conductive magnets 14 are shown facilitating the relative movement of two current sources 1. Movable conductive magnets 14 are shown being electrically connected via flexible electrical conductor 12 to an electrically conductive and mechanically connective structural substrate of the current sources 1. Multiple current sources may be connected in a serial manner to increase the collective voltage supplied by the assembly. Magnetic poles are related to the associated electrical polarity accommodating correct polarities for desirable battery action. Additional current sources so equipped with movable electrically conductive magnets 14 may be accommodated to achieve desirable voltage levels. In this manner many current sources such as batteries may be accommodated in an electrically series manner forming the desired power supply.

Figure 5:
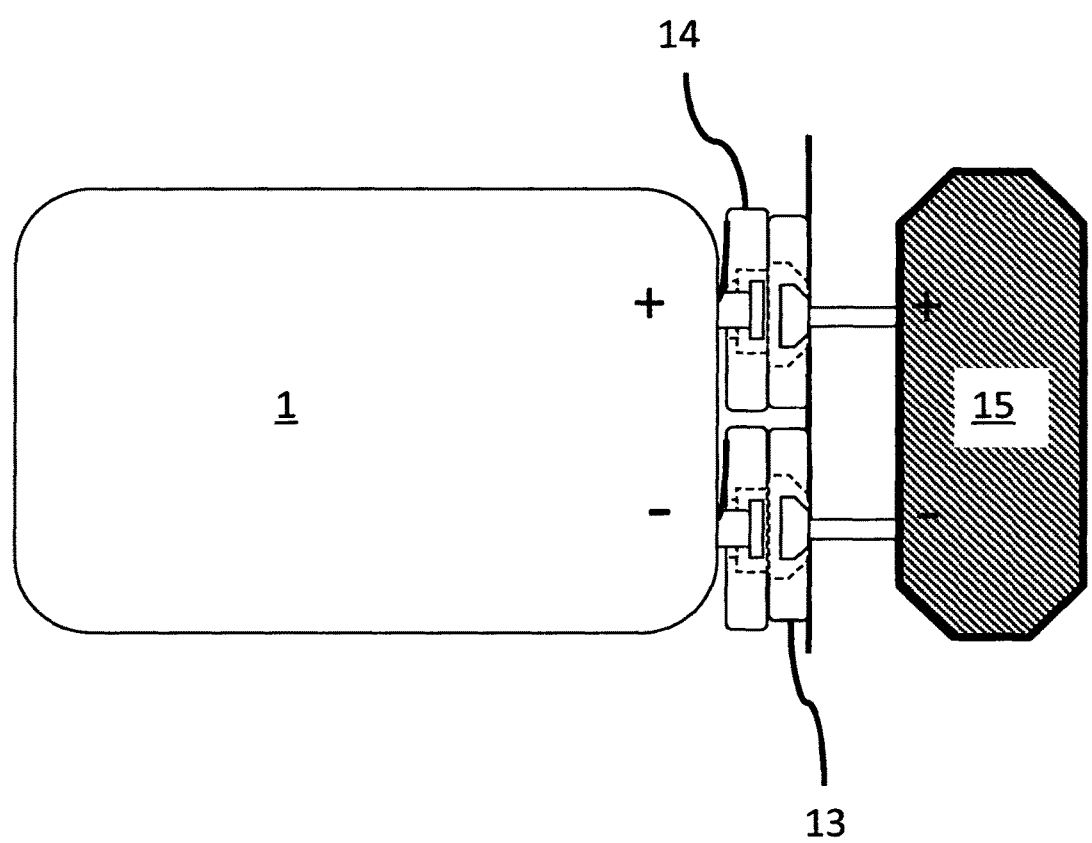
FIG. 5 illustrates a battery such as a typical nine-volt cell connected via the present invention to an electrical load.

FIG. 5 illustrates a current source 1 such as a rectangular prism shaped battery with rounded edges and a polarized connector typical of a nine volt battery further comprised of two moveable conductive magnets 14 at the top is shown connected to fixed conductive magnets 13 forming a two pole magnetic connector for a current source 1, a battery. In this case the current source 1 has restricted mechanical motion in the vertical direction as shown and maximum motion allowed in the horizontal, the horizontal being into and out of the paper as drawn.

The magnetic and electrical polarities of the moveable conductive magnets 14 and the fixed conductive magnets 13 are selected such that the magnetic polarities facilitate magnetic attraction and electrical contact of the preferred electrical current source to the preferred electrical contact via the moveable conductive magnets 14 and the fixed conductive magnets 13. In this manner the battery as shown will easily connect to the electrical device 15 providing the proper polarities. The magnetic polarities of 14 and 13 are chosen to repel each other if an attempt is made to improperly connect them.

In the case where electrical polarities are irrelevant to the desire operation the magnetic and electrical polarities of the moveable conductive magnets 14 and the fixed conductive magnets 13 are selected such that the magnetic polarities facilitate magnetic attraction and electrical contact of the electrical current source to the electrical contact in any orientation via the moveable conductive magnets 14 and the fixed conductive magnets 13. In this manner the battery may be attached in any orientation facilitating electrical contact and reversed accordingly.

Note that the moveable conductive magnets 14 and the fixed conductive magnets 13 as shown as different diameters. It is a preferred embodiment that the electrically conductive contacts are sufficient to accomplish the desired conductive action and they may or may not be of the same or similar shapes or dimensions.

Figure 6:
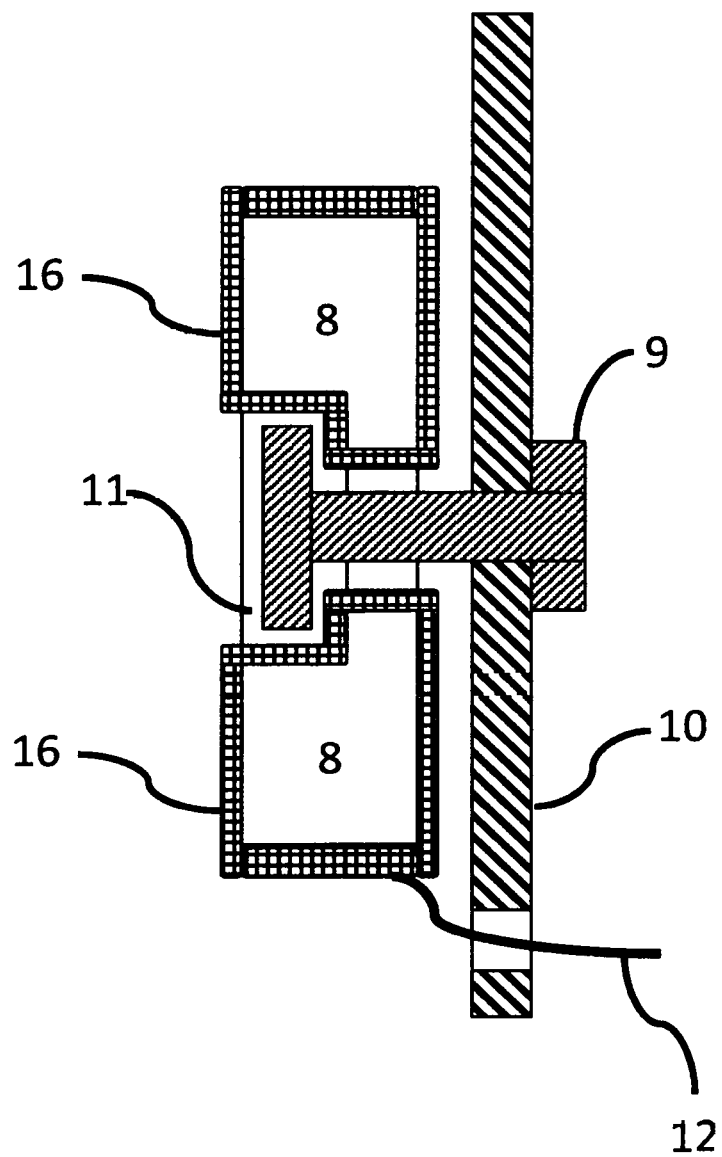
FIG. 6 diagrams functional elements of a version of the floating electrode of the present invention.

FIG. 6 reveals a floating conductive magnet 8 being comprised of a magnetic core being covered by an electrically conductive cladding material 16. In this manner the magnetic action of the magnetic material contained in conductive magnetic 8 facilitates the bringing of electrically conductive cladding 16 into desired electrical contact through magnetic mechanical means. In this case mechanically connective structural substrate 10 is shown as being non-conductive and the conductive cladding material 16 is electrically connected by the flexible electrical conductor 12. The floating conductive magnet 8 is allowed to move along and be retained by fastener 9. The motion of magnet 8 is retained and constrained by fastener 9 and the mechanical interaction of fastener 9 and formed cavity 11. Fastener 9 allows the mechanical motion of magnet 8 as defined by the length and shape of fastener 9 in relation to the formed cavity 11 in magnet 8. Formed cavity 11 simultaneously facilitates and limits the aforesaid mechanical motion and provides for the mechanical retention of magnet 8. Fastener 9 is structural and may also be electrically conductive further facilitating the transfer of electrical energy.

The conductive cladding material 16 is preferred to be mechanically sound and highly electrically conductive. Preferred materials comprising conductive cladding material 16 include all conductors without restriction such as gold, silver, copper, nickel, aluminum and any conductive metal. Carbon, conductive plastics and compositions containing conductive materials are also preferred. Conductive rubberized and elastomeric materials and composition materials providing a conductive path are also preferred as an improvement in the mechanical durability of the conductive cladding material 16.

Figure 7:
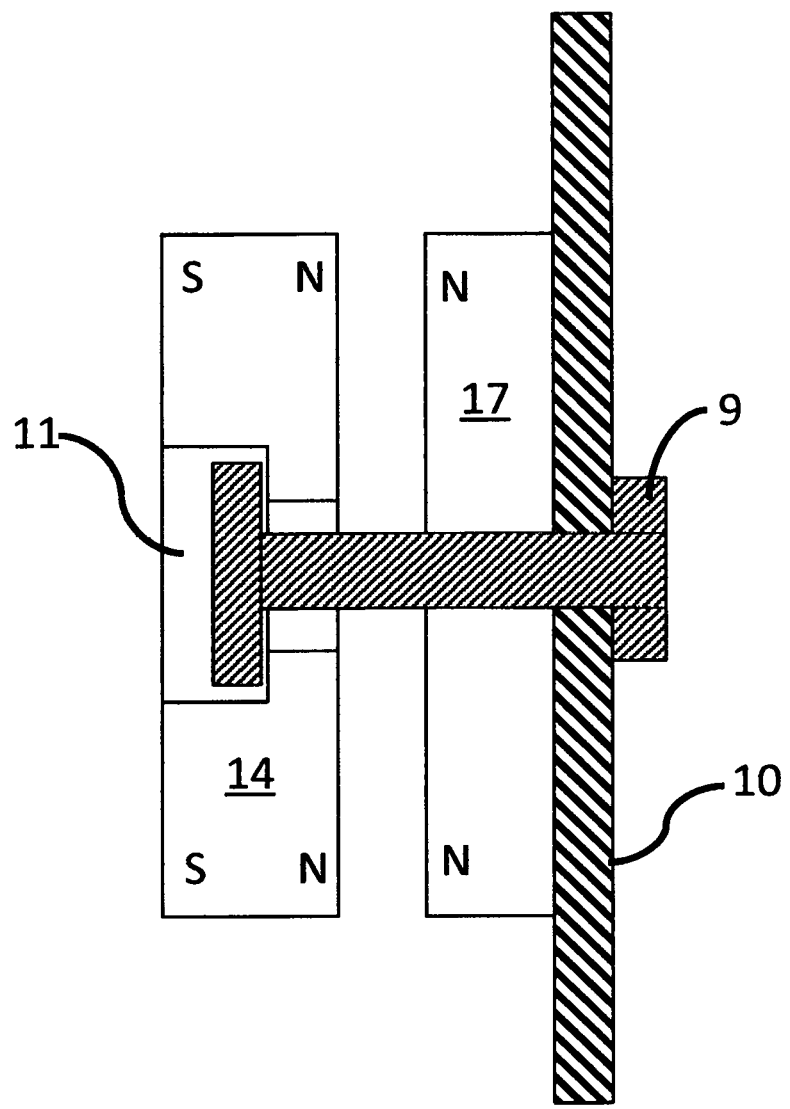
FIG. 7 illustrates in cross-section magnetic spring action as provided by magnetic repulsion between a floating conductive magnet and a fixed repulsive magnet.

FIG. 7 illustrates in cross-section the preferred embodiment of magnetic spring action as provided by magnetic repulsion between moveable conductive magnet 14 and fixed repulsive magnet 17. As shown, the like magnetic poles repel each other forcing the moveable conductive magnet 14 to the limit of its mechanical motion as limited and constrained by fastener 9 and the mechanical interaction of fastener 9 with formed cavity 11. Fixed repulsive magnet 17 is mechanically and selectively conductively connected to connective structural substrate 10.

Figure 8:
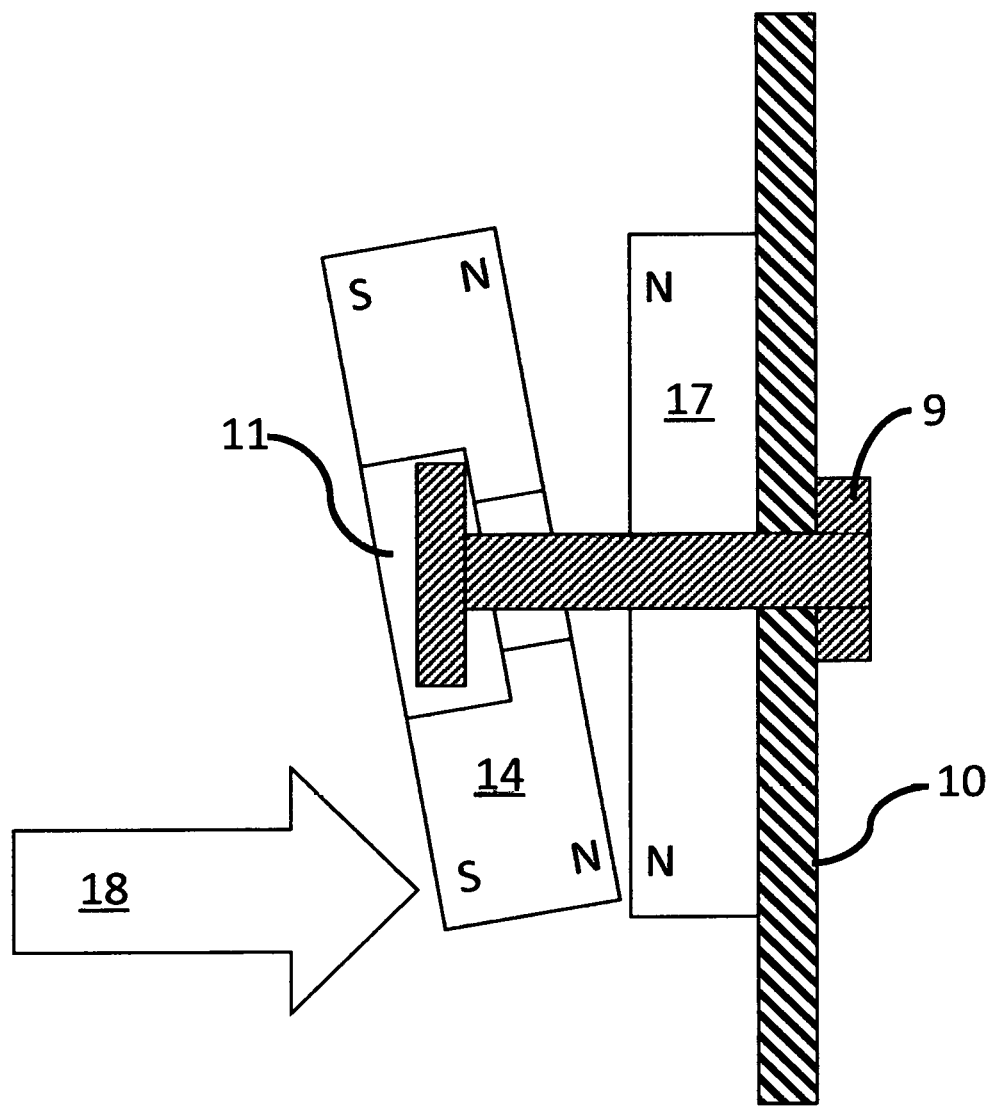
FIG. 8 illustrates magnetic spring action through magnetic repulsion between a floating conductive magnet and a fixed repulsive magnet when a force depresses one side of floating conductive magnet.

FIG. 8 illustrates the preferred embodiment of magnetic spring action as provided by magnetic repulsion between moveable conductive magnet 14 and fixed repulsive magnet 17 when a force 18 depresses one side of moveable conductive magnet 14. As shown the like magnetic poles repel each other forcing the moveable conductive magnet 14 to the limit of its mechanical motion as limited and constrained by fastener 9 and the mechanical interaction of fastener 9 and formed cavity 11, previously shown, and the relative positioning of moveable conductive magnet 14 and fixed repulsive magnet 17 as further constrained by the force 18. Fixed repulsive magnet 17 is mechanically and selectively conductively connected to connective structural substrate 10.

Figure 9:
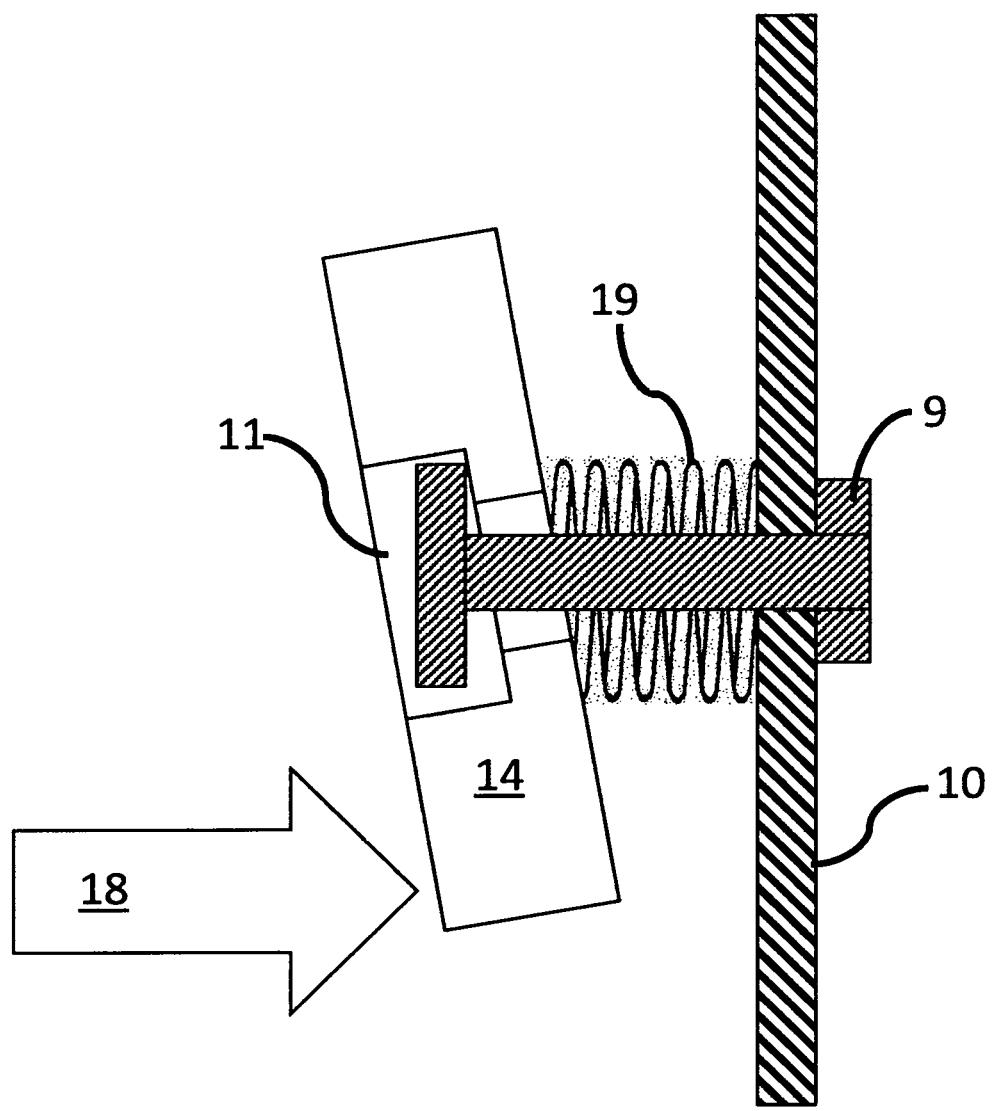
FIG. 9 illustrates mechanical spring action provided by a spring when a force depresses one side of a floating conductive magnet.

FIG. 9 illustrates the preferred embodiment of mechanical spring action as provided by spring 19 when a force 18 depresses one side of moveable conductive magnet 14. As shown the spring 19 forcing the moveable conductive magnet 14 to the limit of its mechanical motion as limited and constrained by fastener 9 and the mechanical interaction of fastener 9 and formed cavity 11, previously shown, as further constrained by the force 18 tilting moveable conductive magnet 14. Spring 19 is mechanically and selectively conductively connected to connective structural substrate 10. In the case where spring 19 is conductive it provides a conduction path between moveable conductive magnet 14 and connective structural substrate 10.

Spring 19 may be provided by the action of a mechanical spring of any material including but not limited to foam such as memory foam, rebounding filler and other similar materials providing the mechanical function and or electrical function as desired for the application. The action of spring 19 may provide fast or slow rebound as required by the application. Spring 19 is preferred to be electrically connected to conductive magnet 14 and connective structural substrate 10 by conductive solder or other conductive fusion means.

Figure 10:
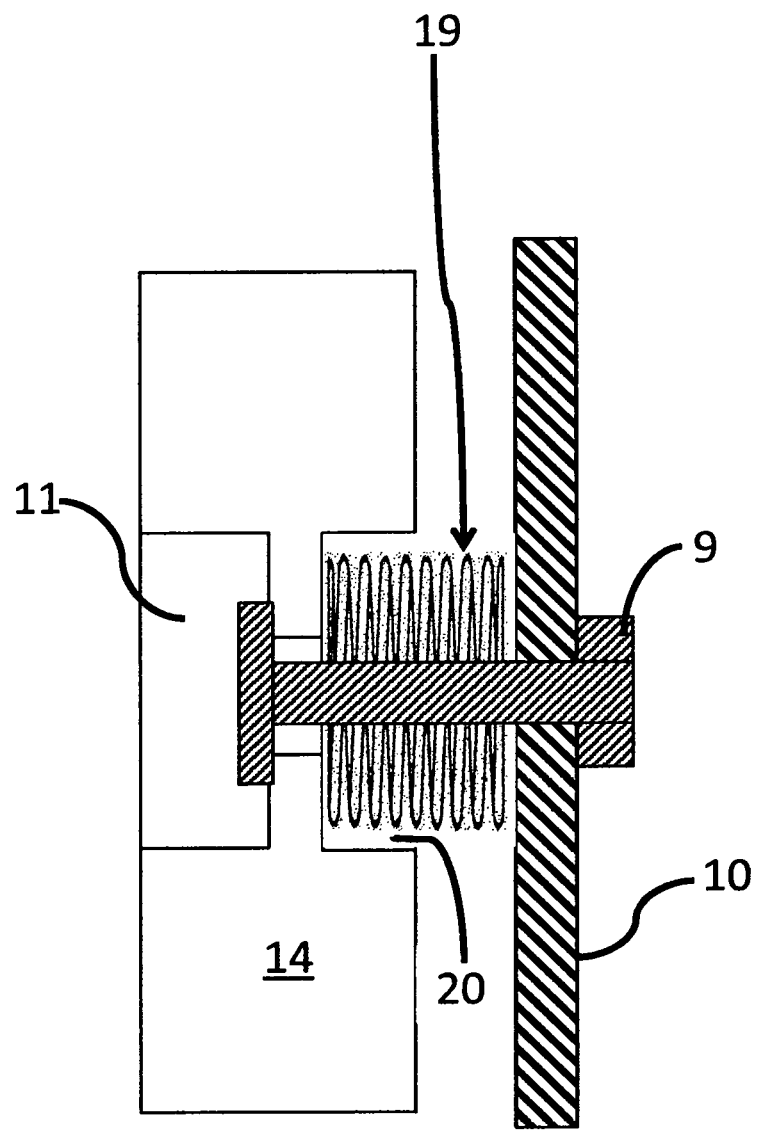
FIG. 10 illustrates a floating conductive magnet with a mechanical spring action and a cavity that the spring fits inside.

FIG. 10 illustrates a moveable conductive magnet 14 with a mechanical spring action as provided by spring 19 and a cavity 20 that spring 19 fits inside. As shown the spring 19 has positioned moveable conductive magnet 14 at its maximum extension as constrained by fastener 9 and the mechanical interaction of fastener 9 and formed cavity 11. Spring 19 is optionally electrically connected to structural substrate 10.

Figure 11:
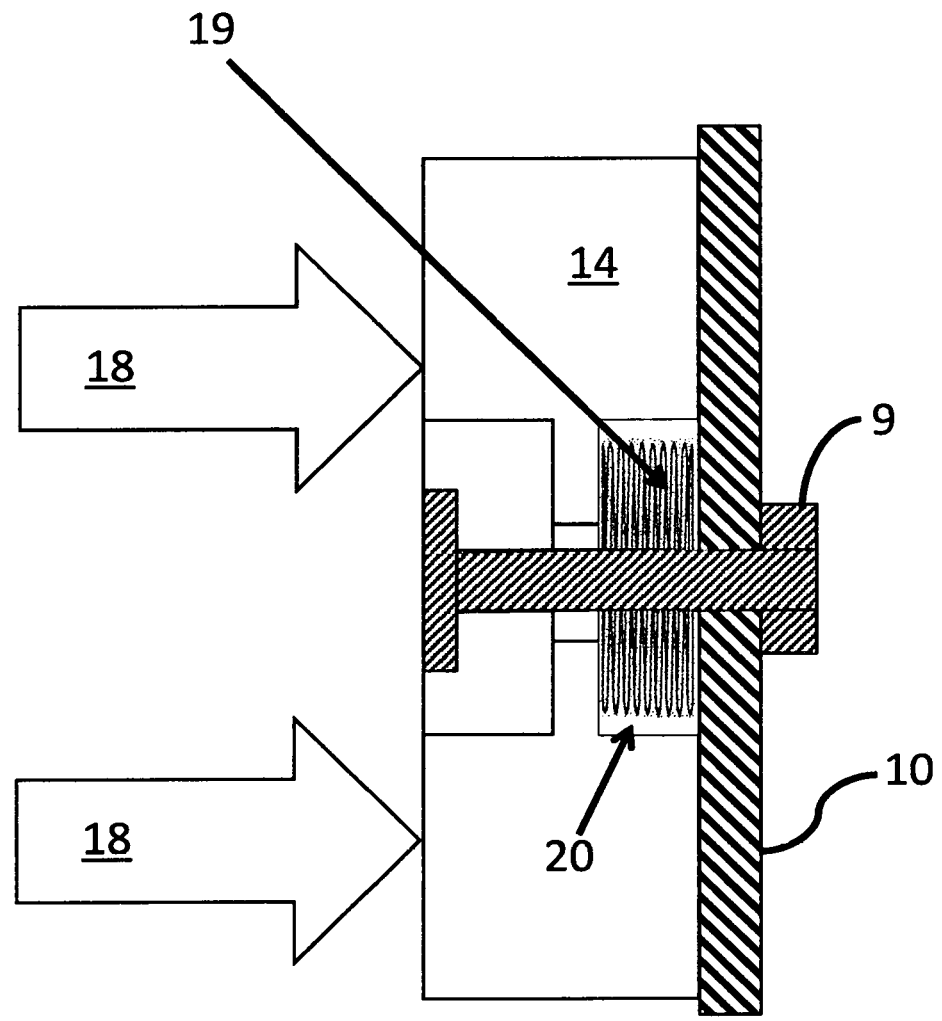
FIG. 11 illustrates the floating conductive magnet at its minimum position as it is completely compressed against structural substrate by a force.

FIG. 11 illustrates a moveable conductive magnet 14 with a mechanical spring action as provided by spring 19 and an integrated cavity 20 that spring 19 fits inside. As shown the moveable conductive magnet 14 is at its minimum position and is completely compressed against structural substrate 10 by force 18. The spring 19 is fully contained by cavity 20 and does not impede the contact of moveable conductive magnet 14 and conductive structural substrate 10. Fastener 9 is selectively conductive or non-conductive as required.

Figure 12:
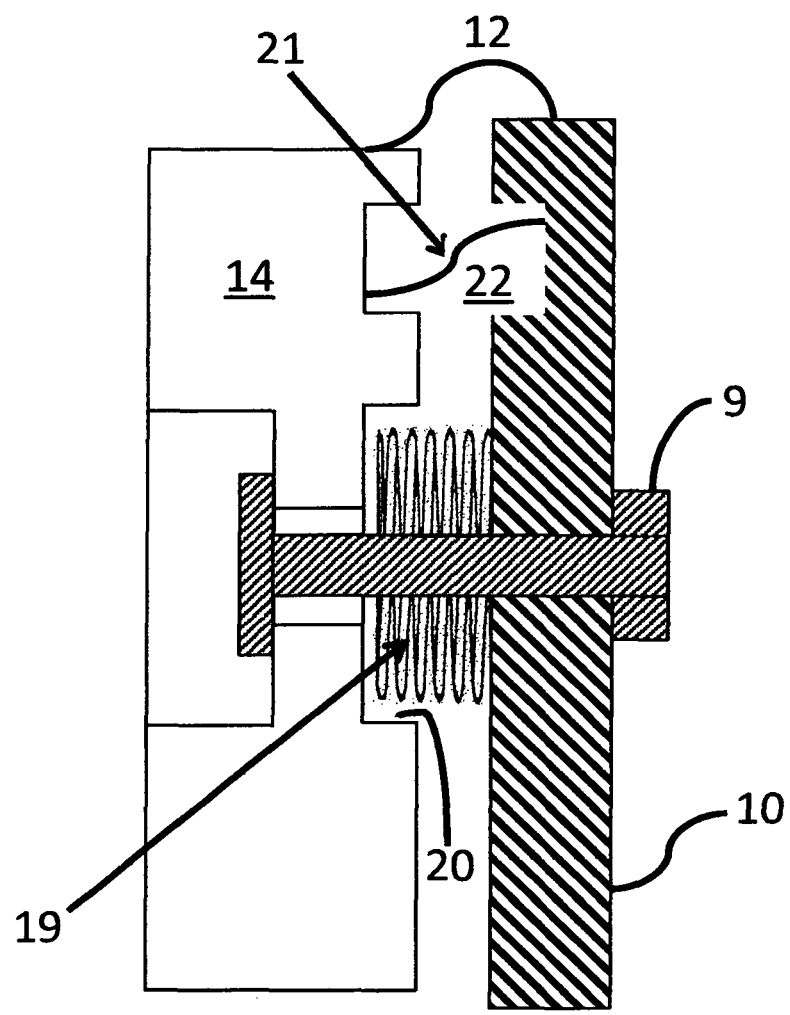
FIG. 12 illustrates the spring forcing the floating conductive magnet to the limit of its mechanical motion as limited and constrained by the fastener and the mechanical interaction of the fastener and formed cavities.

FIG. 12 illustrates a moveable conductive magnet 14 with a mechanical spring action as provided by spring 19 and an integrated cavity 20 that spring 19 fits inside. As shown the spring 19 forcing the moveable conductive magnet 14 to the limit of its mechanical motion as limited and constrained by fastener 9 and the mechanical interaction of fastener 9 and formed cavity 11. As shown the moveable conductive magnet 14 is at its maximum extended position. The mechanically flexible electrical conductors 12 and 21 electrically connect moveable conductive magnet 14 to the conductive structural substrate 10. Mechanically flexible electrical conductor 21 electrically contacts and connects the external surfaces of moveable conductive magnet 14 and conductive structural substrate 10 without the possibility of mechanical interference with the relative motions of the various components. Mechanically flexible electrical conductor 21 electrically contacts and connects the conductive surfaces of moveable conductive magnet 14 and conductive structural substrate 10. Mechanically flexible electrical conductor 21 is positioned within a cavity 22 formed either completely within the volume of moveable conductive magnet 14, or completely within the volume of conductive structural substrate 10, or completely within the cavity 22 formed from both the volume of moveable conductive magnet 14 and conductive structural substrate 10. The various voids forming cavity 22 are geometrically aligned to insure the proper formation of a closed cavity 22 upon compression of the spring 19 and the complete and unimpeded containment of mechanically flexible electrical conductor 21.

Figure 13:
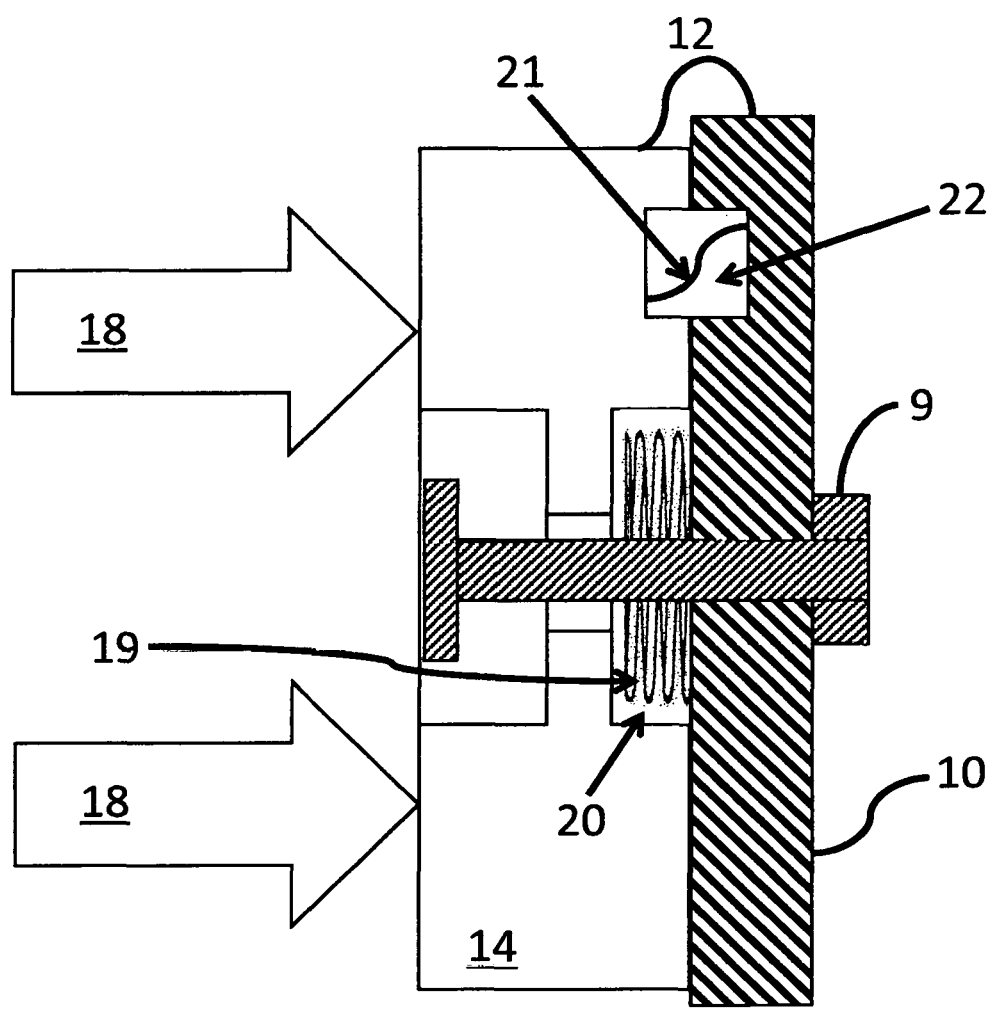
FIG. 13 illustrates the spring forcing the floating conductive magnet to the limit of its mechanical motion as limited by the structural substrate and the mechanical interaction of the fastener and formed cavities.

FIG. 13 illustrates a moveable conductive magnet 14 with a mechanical spring action as provided by spring 19 and an integrated cavity 20 that spring 19 fits inside. As shown the spring 19 is compressed with the moveable conductive magnet 14 forced to the limit of its mechanical motion as limited and constrained by fastener 9 and the mechanical interaction of moveable conductive magnet 14 and structural substrate 10. As shown the moveable conductive magnet 14 is at its maximum compressed position as per force 18 and is in direct contact with conductive structural substrate 10. The mechanically flexible electrical conductors 12 and 21 electrically connect moveable conductive magnet 14 to the conductive structural substrate 10. Mechanically flexible electrical conductor 12 electrically contacts and connects the external surfaces of moveable conductive magnet 14 and conductive structural substrate 10 without the possibility of mechanical interference with the relative motions of the various components as shown. Mechanically flexible electrical conductor 21 electrically contacts and connects the conductive surfaces of moveable conductive magnet 14 and conductive structural substrate 10. Mechanically flexible electrical conductor 21 is positioned within a cavity 22 shown formed from both the volumes of moveable conductive magnet 14 and conductive structural substrate 10. The separate voids forming cavity 22 are geometrically aligned to insure the proper formation of the closed cavity 22 and the complete and unimpeded containment of mechanically flexible electrical conductor 21.

Figure 14:
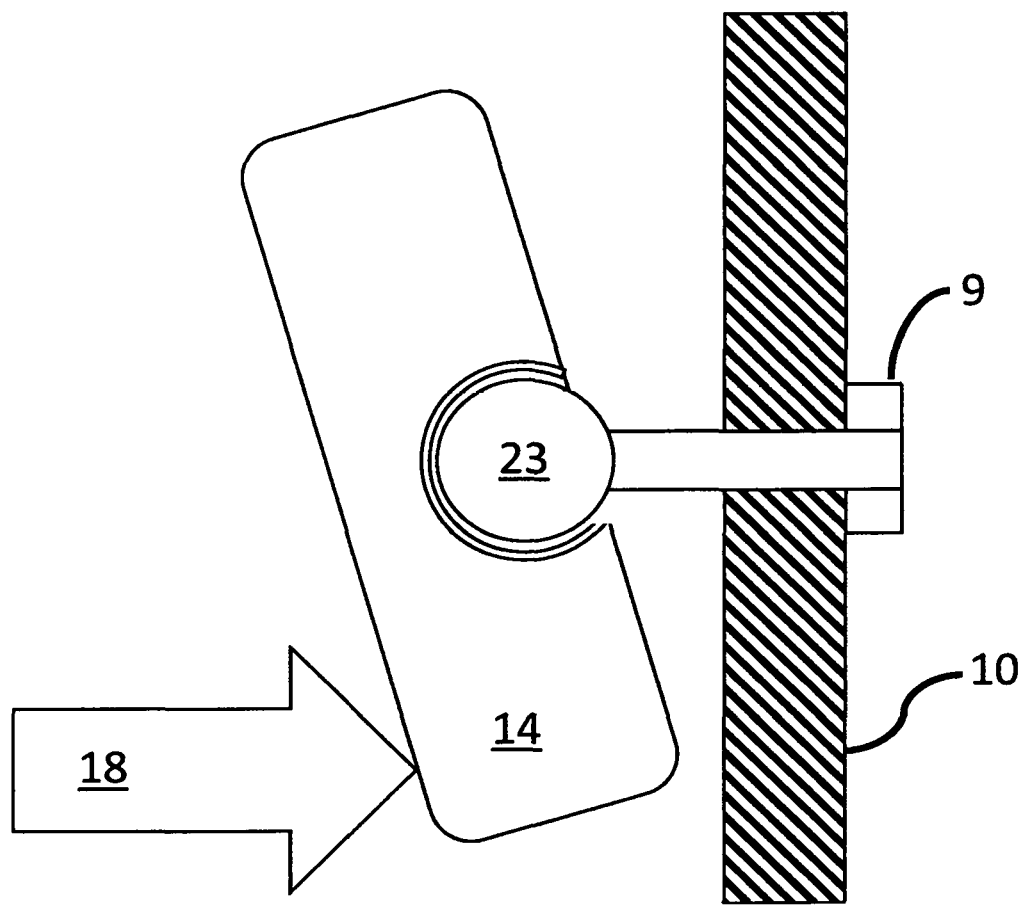
FIG. 14 illustrates a floating conductive magnet floating as it rotates on a rod attached to a fastener in response to a force.

FIG. 14 illustrates moveable conductive magnet 14 expressing 2 degrees of freedom as it rotates on rod 23 attached to fastener 9 in response to force 18. The various methods and means herein revealed to limit or control the motion and position of moveable conductive magnet 14 are not shown in FIG. 14 but apply equally in all variations. Rod 23 comprises a length and a diameter constituting a rod and may have perpendicularly flat or rounded or shaped ends as is required for its desired operation. End cap retainers and other retention means for rod 23 are hereby incorporated by reference and not shown due to their common use in the mechanical and structural arts. Rotary spring means may be applied or the moveable conductive magnet 14 may remain in a driven position until acted upon by a force 18. Rod 23 may be of any shape including a sphere allowing moveable conductive magnet 14 four degrees of freedom.

Figure 15:
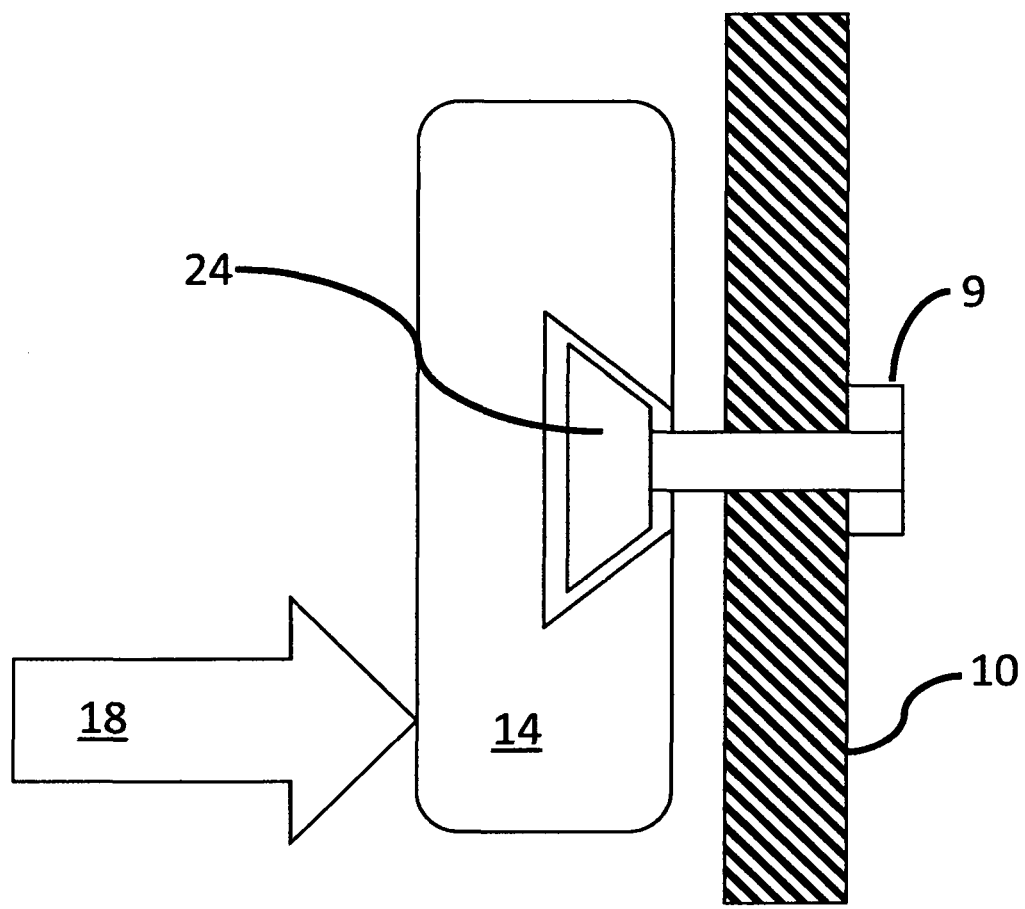
FIG. 15 illustrates a floating conductive magnet rotatable on a bearing attached to a fastener not moving in response to a force being applied tangentially to the rotatable axis of a floating conductive magnet.

FIG. 15 illustrates moveable conductive magnet 14 rotatable on bearing 24 attached to fastener 9 not moving in response to force 18 being applied tangentially to the rotatable axis of moveable conductive magnet 14. Moveable conductive magnet 14 is free to rotate on the axis defined by bearing 24 without regard to rotational direction.

Figure 16:
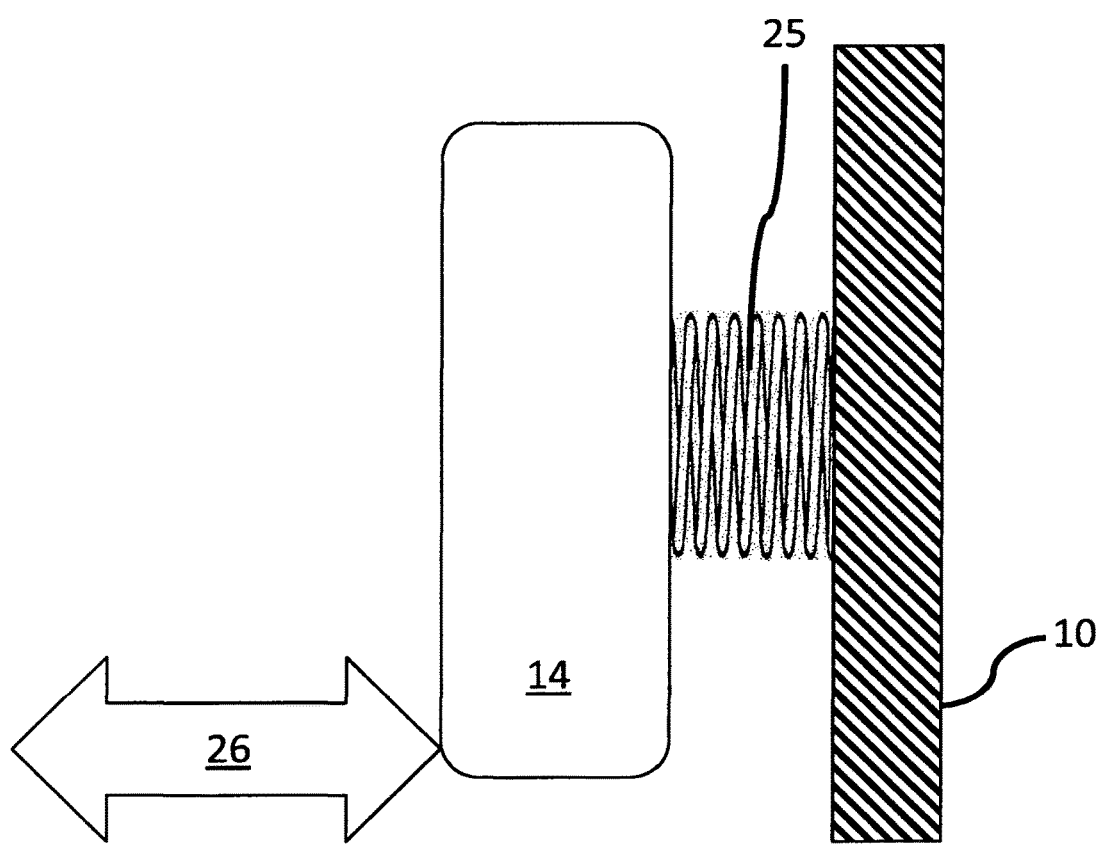
FIG. 16 illustrates a floating conductive magnet attached to a conductive spring attached to a conductive structural substrate.

FIG. 16 illustrates moveable conductive magnet 14 attached to spring 25 attached to conductive structural substrate 10. Spring 25 is selected to be conductive or non-conductive as suits the application, and in the case of spring 25 being non-conductive a mechanically flexible electrical conductor 12 not shown is utilized to complete the electrical conduction path. Bidirectional force 26 is shown to illustrate the constrained six degrees of freedom provided by the spring 25.

Figure 17:
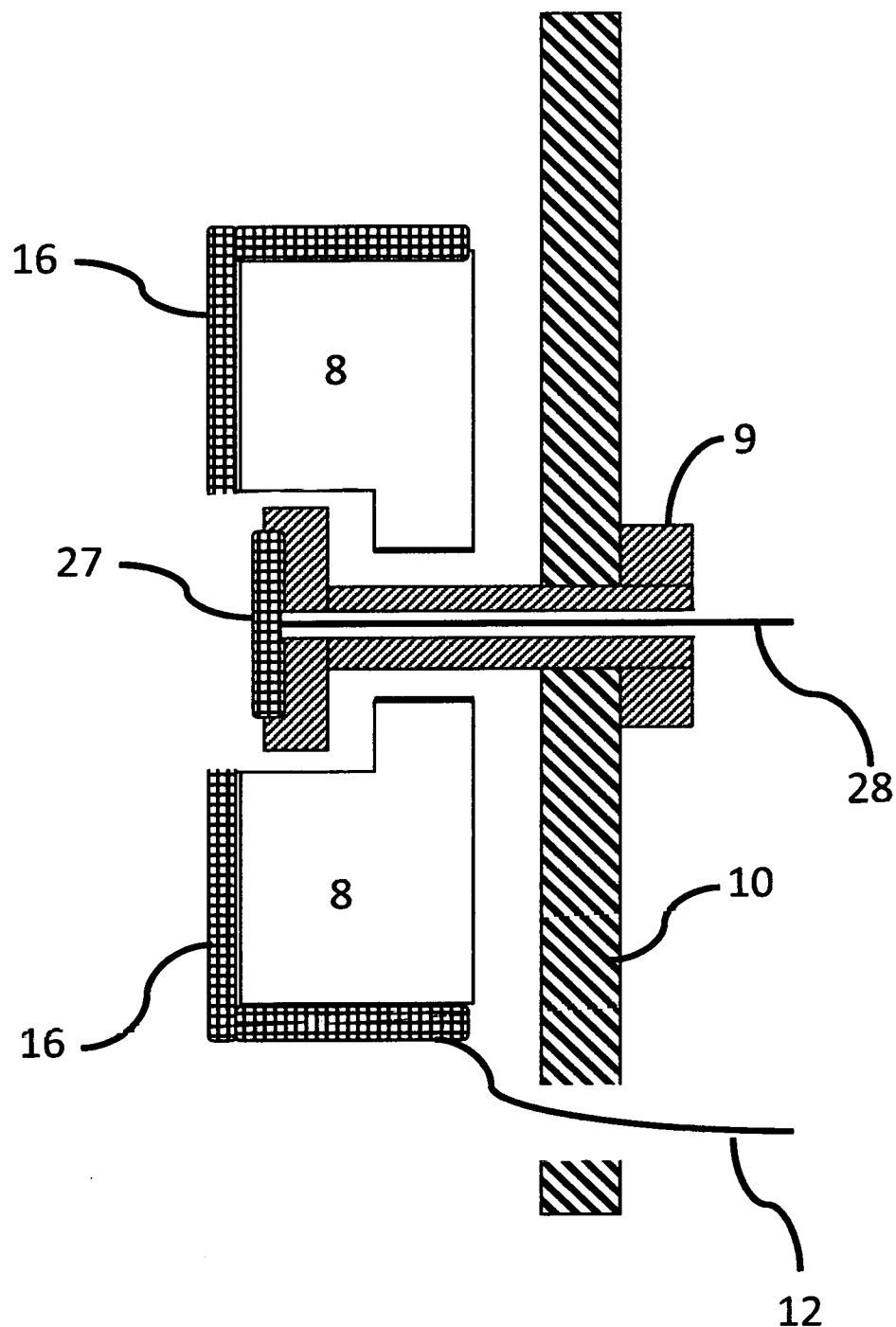
FIG. 17 illustrates a free-floating conductive magnet shown being comprised of a magnetic core being covered by an electrically conductive cladding material and a fixed center electrical conductor.

FIG. 17 illustrates floating conductive magnet 8 shown being comprised of a magnetic core being covered by an electrically conductive cladding material 16. In this manner the magnetic action of the magnetic material contained in conductive magnetic 8 facilitates the bringing of electrically conductive cladding 16 into desired electrical contact through magnetic mechanical means. In this case mechanically connective structural substrate 10 is shown as being non-conductive and the conductive cladding material 16 is electrically connected by the flexible electrical conductor 12. The center electrically conductive cladding 27 is integrated into fastener 9 and electrically connected through electrical conductor 28. Fastener 9 is configured to be electrically insulated and non-conductive. Many other combinations of electrical conduction and mechanical arrangement of the illustrated components are possible and are included herein by reference.

The conductive cladding material 16 is preferred to be mechanically sound and highly electrically conductive. Preferred materials comprising conductive cladding material 16 include all conductors without restriction such as gold, silver, copper, nickel, aluminum and any conductive metal. Carbon, conductive plastics and compositions containing conductive materials are also preferred. Conductive rubberized and elastomeric materials and composition materials providing a conductive path are also preferred as an improvement in the mechanical durability of the conductive cladding material 16.

Figure 18:
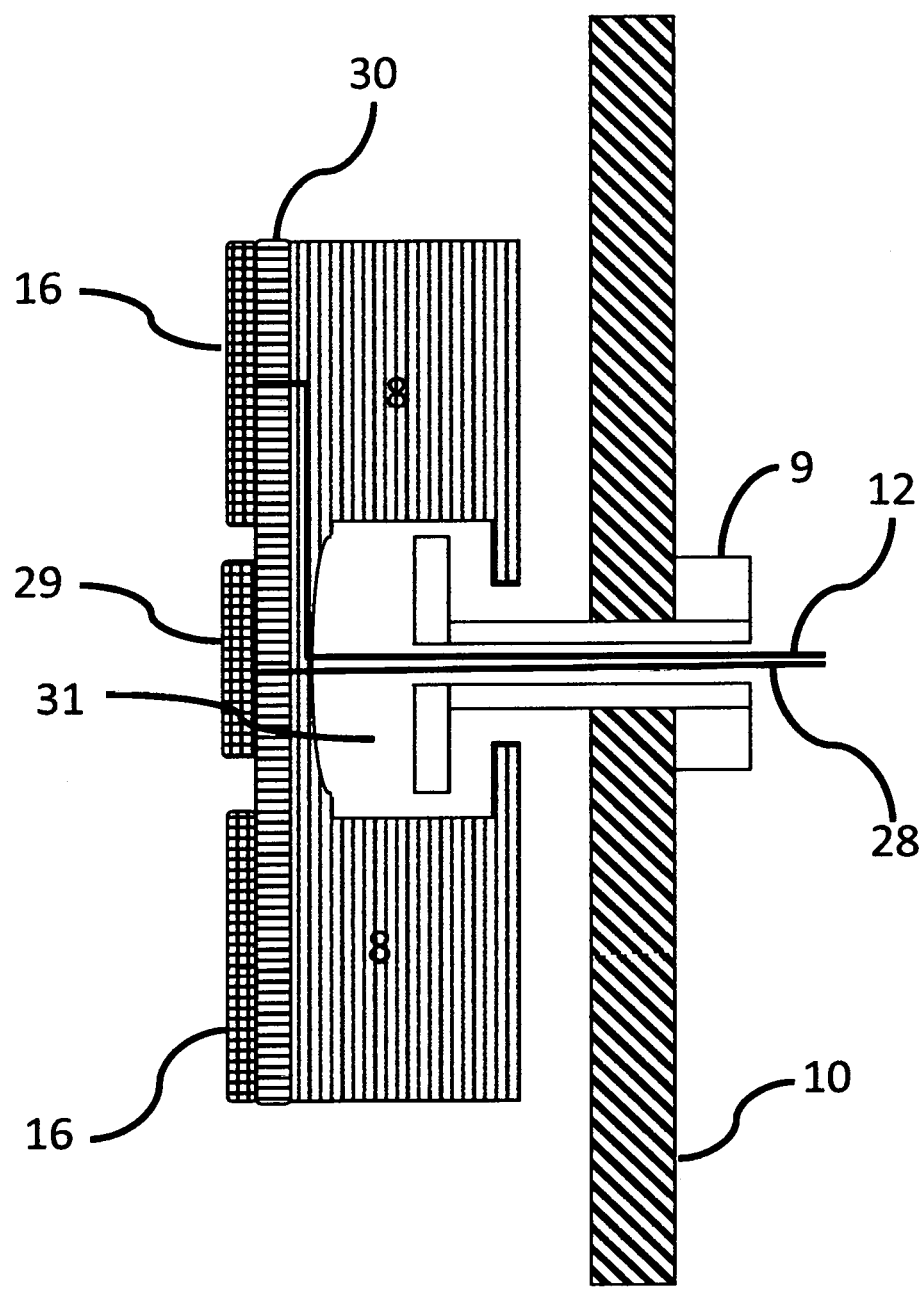
FIG. 18 illustrates a floating conductive magnet comprised of a magnetic core covered by electrically conductive cladding materials. The domed shaped cavity facilitates the relative motions.

FIG. 18 illustrates floating conductive magnet 8 shown being comprised of a magnetic core being covered by an electrically conductive cladding materials 16 and 29. Electrically conductive cladding materials 16 and 29 are intended to be connected to electrically different poles of the battery or device being powered. For example, the electrically conductive cladding material 16 is connected to the positive voltage polarity and electrically conductive cladding material 29 is connected to the negative voltage polarity. These may be reversed as per the application. In the case of an alternating current connection the connections are made in reference to safety and electrical ground considerations. In this manner the magnetic action of the magnetic material contained in floating conductive magnet 8 facilitates the bringing of electrically conductive cladding 16 and 29 into desired electrical contact through magnetic mechanical means. In this case mechanically connective structural substrate 10 is shown as being non-conductive and the conductive cladding materials 16 and 29 are electrically connected by the flexible electrical conductors 12 and 28. The center electrically conductive cladding 29 is electrically connected through electrical conductor 28. Flexible substrate 30 is selected to facilitate the minor motions of conductive cladding materials 16 and 29 when connected to a source or sink. Shaped cavity 31 facilitates the action of fastener 9 as it retains the assembly comprised of floating conductive magnet 8, conductive cladding materials 16 and 29, and flexible substrate 30. The domed shape of shaped cavity 31 facilitates the relative motions and provides a space preventing the pinching of flexible electrical conductors 12 and 28.

The conductive cladding materials 16 and 29 are preferred to be mechanically sound and highly electrically conductive. Preferred materials comprising conductive cladding material 16 and 29 include all conductors without restriction such as gold, silver, copper, nickel, aluminum and any conductive metal. Carbon, conductive plastics and compositions containing conductive materials are also preferred. Conductive rubberized and elastomeric materials and composition materials providing a conductive path are also preferred as an improvement in the mechanical durability of the conductive cladding material 16 and 29. Flexible substrate 30 is preferred to be comprised of an elastomer, rubber, rubberized material, synthetic, or any elastic material that is non-conductive or otherwise coated or treated to be non-conductive.

Figure 19:
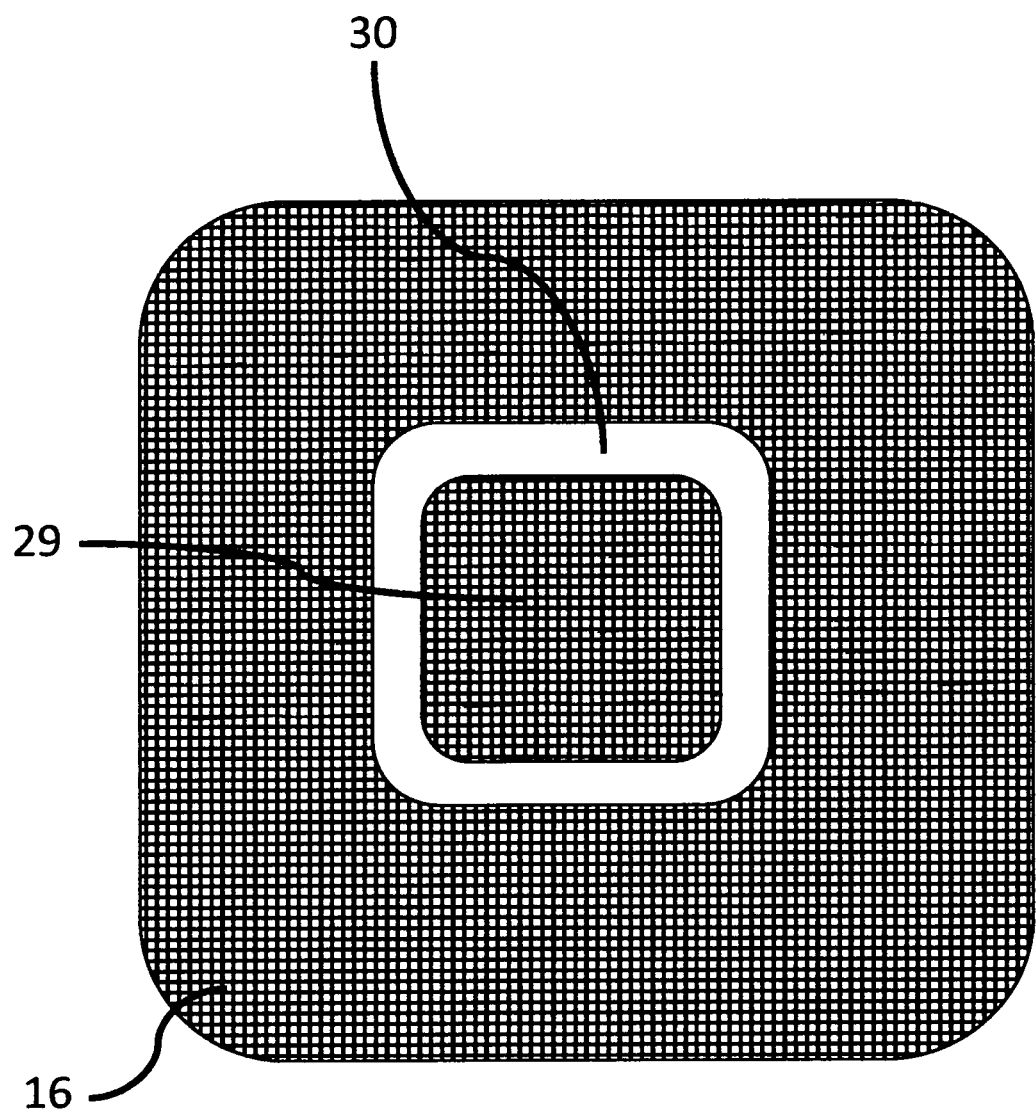
FIG. 19 illustrates electrically conductive cladding materials overlaying a flexible substrate.

FIG. 19 illustrates electrically conductive cladding materials 16 and 29 overlaying a flexible substrate 30. These cladding materials and the overall shape of the connector may be chosen within any geometric form to include three dimensional shapes such as spheres, planes, pyramids and so on with the connecting and complementary connector being the complementary component so as to completely or sectionally facilitate contact. The electrically conductive cladding materials 16 and 29 may be chosen as to electrical polarity, ground, high and other electrical potential attributes as required. The electrically conductive cladding materials 16 and 29 may be chosen to present similar or dissimilar conductive geometric areas. For example the electrically conductive cladding materials 16 and 29 may be structured to present the same surface areas facilitating equal or near equal conductive surfaces.

Figure 20:
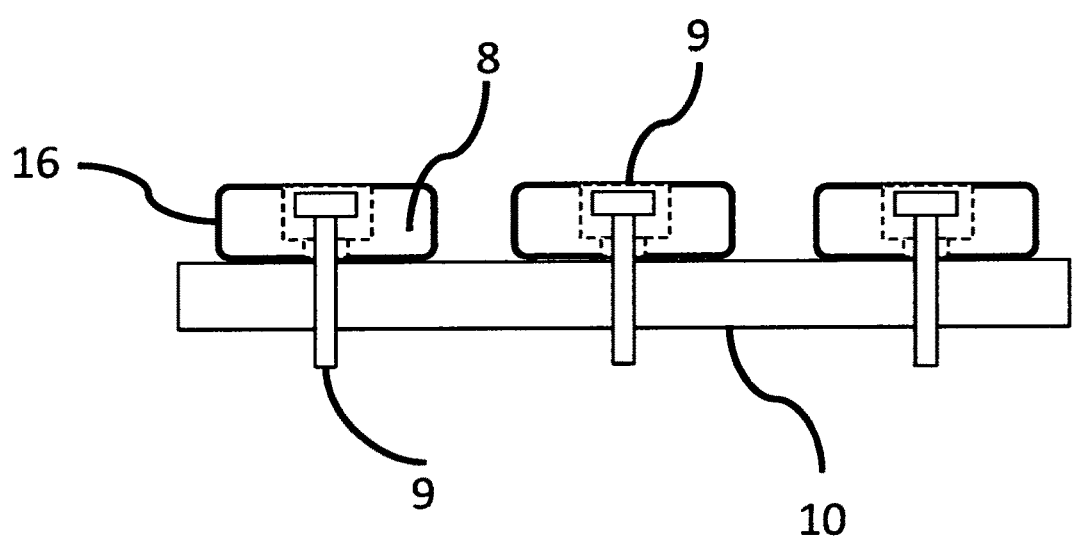
FIG. 20 illustrates three conductive magnets comprised of a magnetic core being covered by an electrically conductive cladding material shown mounted on a common substrate.

FIG. 20 illustrates three conductive magnets 8 shown being comprised of a magnetic core being covered by an electrically conductive cladding material 16. In this manner the magnetic action of the magnetic material contained in conductive magnetic 8 facilitates the bringing of electrically conductive cladding 16 into desired electrical contact through magnetic mechanical means. Fastener 9 is conductive as preferred and facilitates electrical connectivity and conduction. Fastener 9 extends through structural substrate 10 to facilitate electrical connection. With multiple conduction channels the present invention provides mechanical reversibility of an electrical connection without electrical reversal of the connection.

Figure 21:
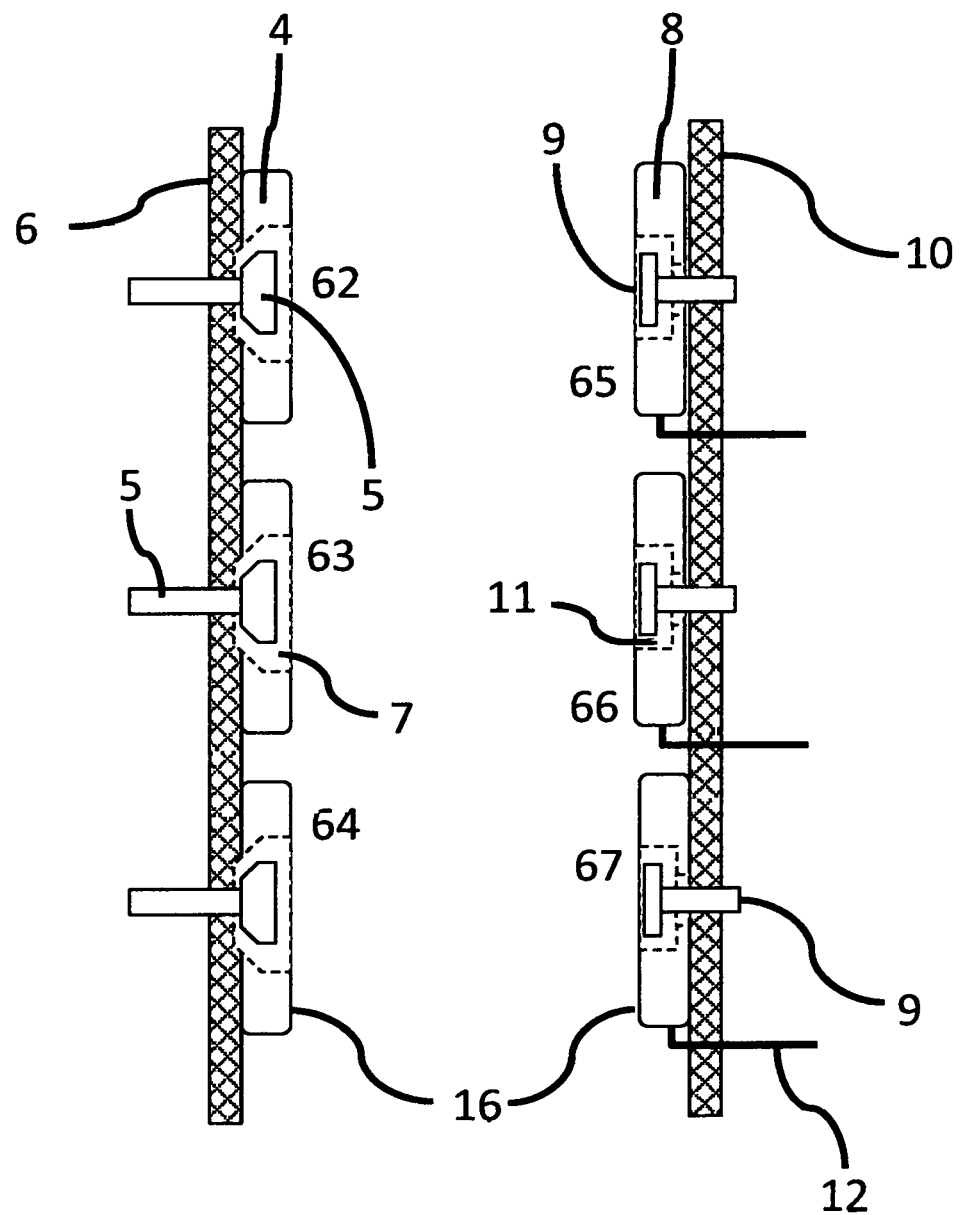
FIG. 21 illustrates three fixed conductive magnets aligned to intersect with three floating conductive magnets.

FIG. 21 illustrates three conductive magnets 4 aligned to intersect with conductive magnets 8. Conductive magnets 4 are chosen with a magnetic orientation to facilitate the desired mechanical connection with conductive magnets 8. For example, conductive magnets 4 and 8 may be oriented such that all conductive magnets 4 present the north magnetic pole with respect to floating conductive magnet 8. Conductive magnets 8 are oriented to present the south magnetic pole with respect to conductive magnets 4. When conductive magnets 4 and 8 are brought together they attract each other and contact forming an electrically conductive connection. In this manner the assemblies will connect in any direction and can be aligned such that only one, two or all three magnetic actions of each assembly contact the magnetic actions of the other assembly. This may or may not be desirable depending on the application. Many other combinations and connection orientations are possible and are included as preferred embodiments of the present invention.

Conductive magnet assemblies 62, 63, and 64 are comprised of fixed conductive magnet 4 and conductive fastener 5. Conductive magnet assemblies 65, 66 and 67 are comprised of floating conductive magnet assemblies as herein described in their various forms. The magnetic and electrical properties of each of the conductive magnet assemblies are selectable in any of the various possible combinations. For example, conductive magnet assemblies 62, 64, and 66 are selected to present the magnetic north pole. Conductive magnet assemblies 63, 65 and 67 are selected to present the magnetic south pole. In this manner the overall assemblies are mechanically reversible facilitating magnetic and electrical connection in a reversible orientation and preventing connection in anything other than a desirable magnetic and electrical orientation due to magnetic repulsion. For another example, conductive magnet assemblies 62, 63, and 67 are selected to present the magnetic north pole. Conductive magnet assemblies 65, 66 and 64 are selected to present the magnetic south pole. In this manner the electrical connection is only allowed in the magnetically prescribed manner. The end magnetic action may connect in a useless manner, not connecting any of the other contacts, a one to one connection without mechanical guidance as herein provided.

The three conductive magnets 4 firmly connected by conductive fasteners 5 to a non-conductive structural substrate 6. The conductive magnets 4 are shown formed with a cavity 7 so as to accommodate fastener 5 attaching conductive magnets 4 to substrate 6 without interfering with the mechanical and electrical contact of conductive magnets 4 to conductive magnets 8 by magnetic means. Fasteners 5 are structural and are in this case electrically conductive facilitating the transfer of electrical energy.

Conductive magnets 8 are shown being electrically connected via flexible electrical conductors 12 to a mechanically connective structural substrate 10. The motion of magnets 8 are retained and constrained by fasteners 9 and the mechanical interaction of fasteners 9 and formed cavities 11. Fasteners 9 allows the mechanical motion of magnets 8 as defined by the length and shape of fasteners 9 in relation to the formed cavities 11 in magnets 8. Formed cavities 11 simultaneously facilitate and limit the aforesaid mechanical motion and provides for the mechanical retention of magnets 8. Fasteners 9 are structural and may also be electrically conductive further facilitating the transfer of electrical energy.

The floating conductive magnet 8 is allowed to move along and be retained by fastener 9. Formed cavity 11 in magnet 8 simultaneously defines the limits of motion of magnet 8 in both the lateral, as in back and forth, and angular, as in other than parallel to structural substrate 10. Floating conductive magnet 8 facilitates motion and angular contact in reference to fixed conductive magnet 4, facilitating the making and maintaining of both mechanical and electrical contact when substrates 6 and 10 are parallel or at a relative angle to each other.

When conductive magnets 4 and 8 are allowed to mechanically contact each other through magnetic action a conductive channel is formed through fastener 5, fixed conductive magnet 4, floating conductive magnet 8, mechanically flexible electrical conductor 12, electrically conductive fastener 9, and conductive structural substrate 10. Conductive magnets 4 and 8 are arranged so as to magnetically attract each other to connect the positive to the negative electrical poles of the battery, and repel each other when like electrical poles are brought near each other assuring an electrically correct battery orientation for typical battery operation. Structural substrates 6 and 10 may be selected to be structural only or both conductive and structural.

As shown the mechanical connection via the magnetic attraction of conductive magnet 8 and fixed conductive magnet 4 facilitates rotational motion constrained around the position of fastener 9 in and out of the page, but limits motion in the up and down direction. Facilitating constrained movement of the electrical and mechanical connection provides stress relief on the overall connection.

Figure 22:
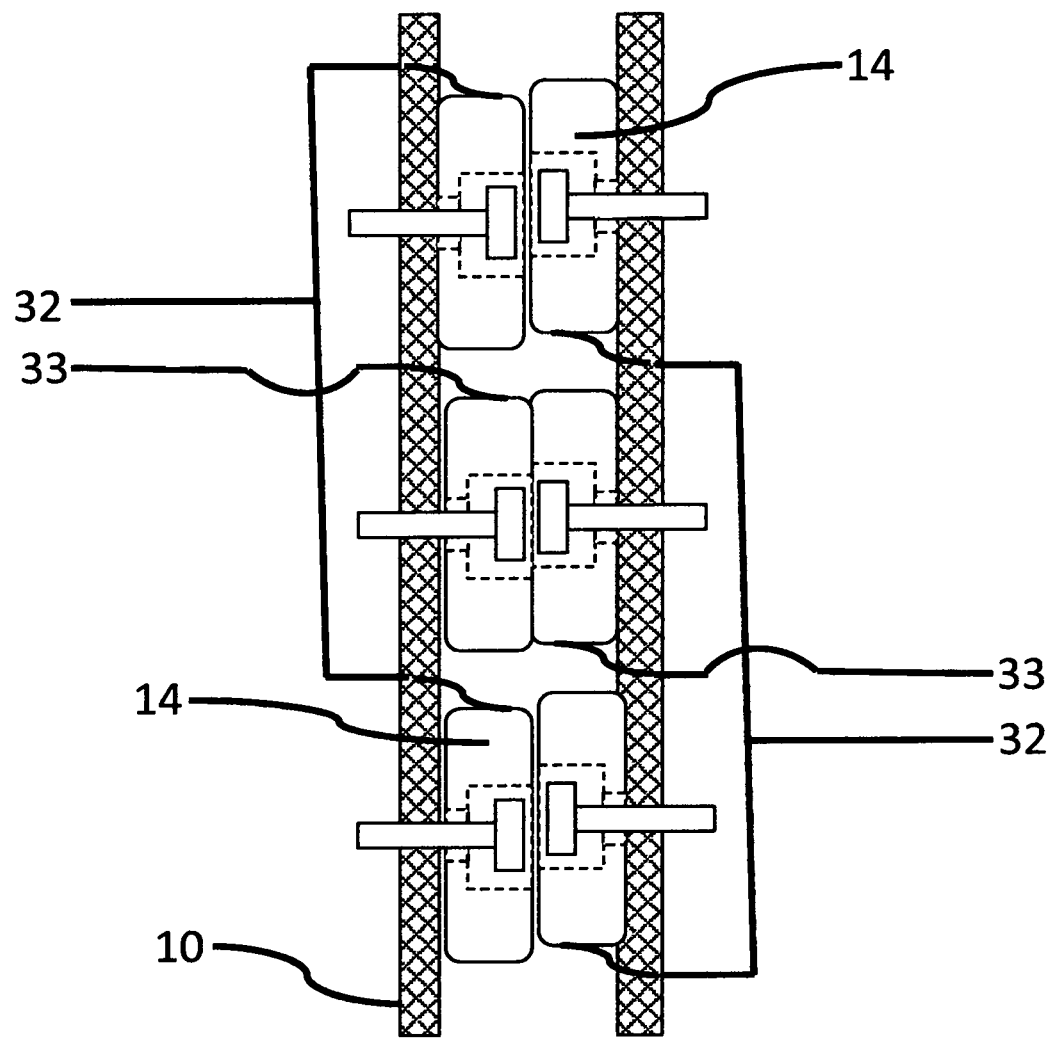
FIG. 22 illustrates six floating conductive magnets mounted on structural substrates connection with each other forming conduction paths.

FIG. 22 illustrates six moveable conductive magnets 14 mounted on structural substrates 10. The moveable conductive magnets 14 are electrically connected to each other such that the outer moveable conductive magnets 14 form an outer conductive path 32, and the center moveable conductive magnets 14 form an interior conductive path 33 selectively sized to provide an equal conduction path as desired to the outer conductive path 32. Magnetic polarities determine electrical poles as only opposites attract. As shown the mechanical connection via the magnetic attraction of moveable conductive magnets 14 providing rotational motion constrained around the position of fastener 9 in and out of the page, but limits motion in the up and down direction. Facilitating constrained movement of the electrical and mechanical connection provides stress relief on the overall connection. The arrangement as shown supports conduction of both direct and alternating current.

Figure 23:
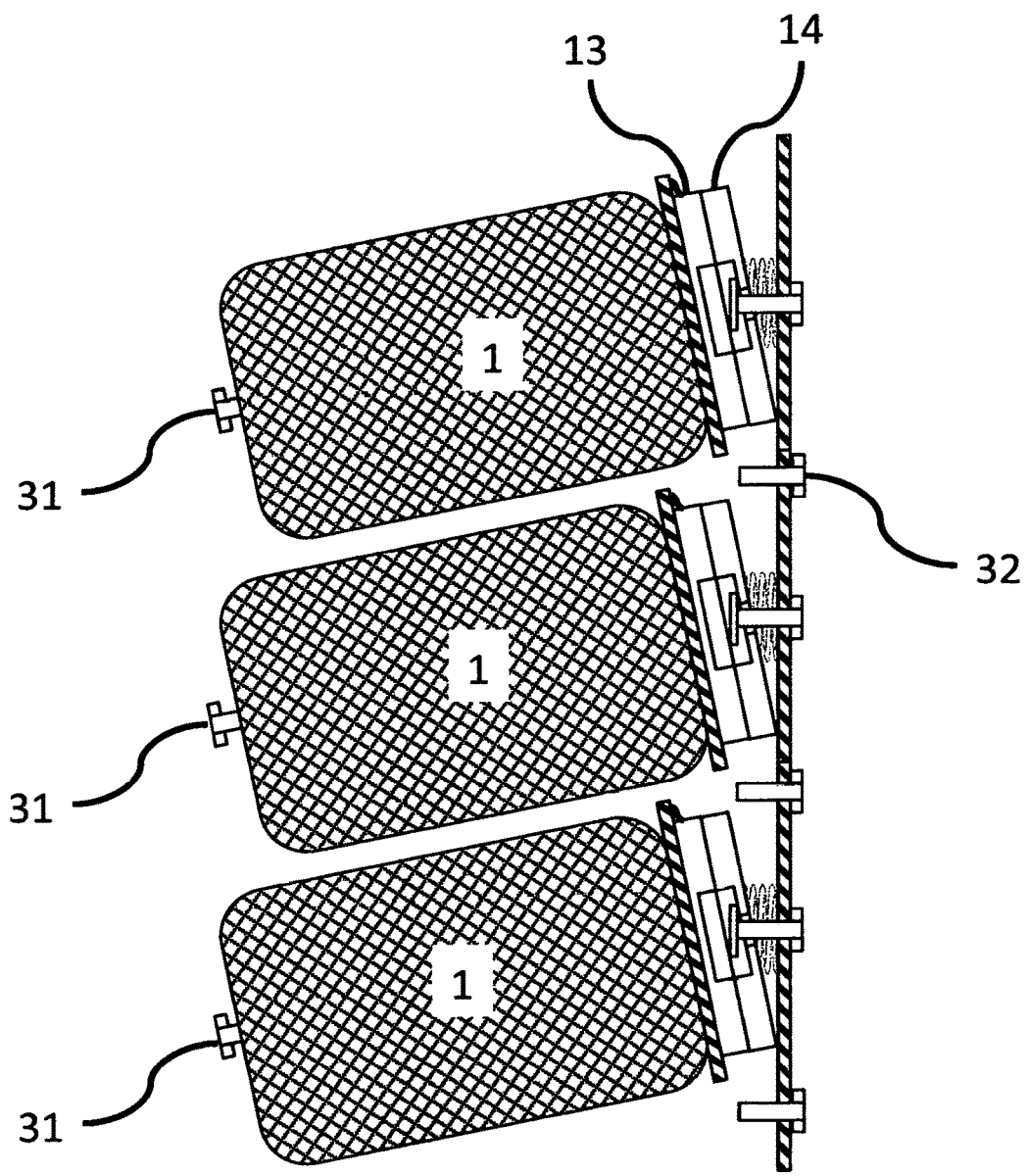
FIG. 23 illustrates three current sources connected with fixed conductive magnets and floating conductive magnets connected at one pole the opposite electrical poles shown as unconnected.

FIG. 23 illustrates three current sources 1 connected with fixed conductive magnets 13 and movable conductive magnets 14, both with the various electrical connection and conduction methods herein described. The current sources 1 are connected at one pole via the present invention and the opposite electrical poles 31 are shown as unconnected. Electrical connectors 32 are shown as unconnected. Current sources 1 are facilitated for use singly or together.

Figure 24:
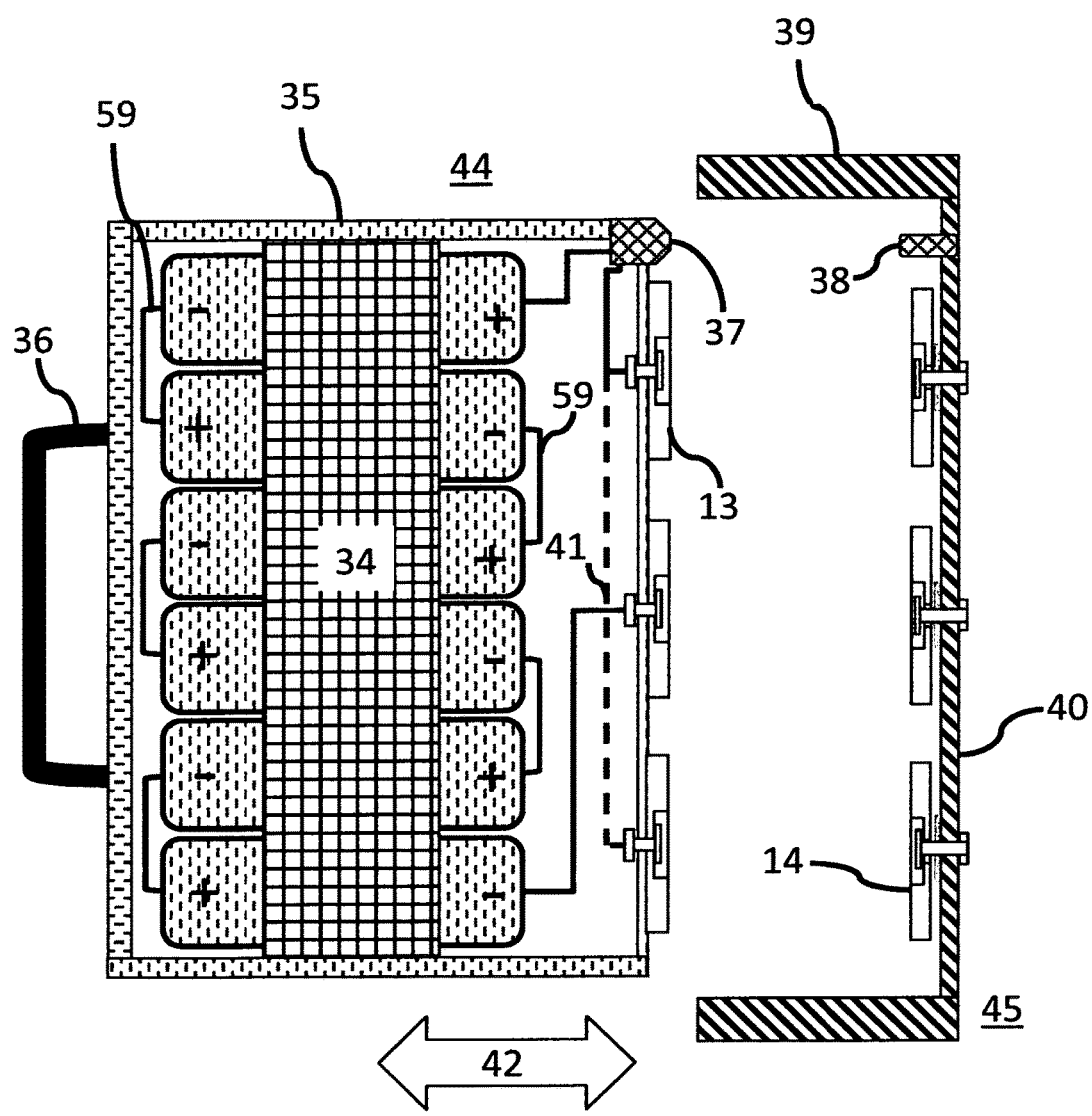
FIG. 24 illustrates battery power pack and power pack receiver.

FIG. 24 illustrates battery power pack 44 made up of current sources 1 mechanically banded and electrically connected forming banded battery array 34. Banded battery array 34 is housed in containment 35. Containment 35 facilitates containment, protection and function of the banded battery array 34. Containment 35 structurally and electrically connects banded battery array 34 with fixed conductive magnets 13 and facilitates the function of fixed conductive magnets 13, three each shown in the illustration's presented configuration though any number are within the scope of the present invention. The containment 35 is moved by hand via the function of handle 36. Safety switch 37 is an electrical normally open switch that disconnects the fixed conductive magnets 13 array by disconnecting the battery cartridge electrical conductors 41 from the banded battery array 34 preventing the possibility of shorting or otherwise permitting unintended current flow. Battery cartridge electrical conductors 41 permit normal power operations of battery power pack 44 when safety switch 37 is closed by safety switch contactor 38. Containment 35 is preferred waterproof or water resistant as per an electronic conformal coating to facilitate washing with water and cleaning products and is preferred to incorporate a removable cover as required for a particular application.

Battery power pack receiver 45 is comprised of moveable conductive magnets 14 mechanically bound by battery power pack receiver backplane 40. Battery power pack receiver backplane alignment guides 39 provide mechanical alignment and initial retention of battery power pack 44 as it is inserted or removed from battery power pack receiver 45.

Battery element connectors 59 are shown connecting the current sources 1 forming the electrical connectivity for banded battery array 34.

Battery cartridge insert/removal motion 42 indicates the direction of insertion and removal of battery power pack 44 to and from power pack receiver 45.

Conductive magnets may be of any type or combination or connectivity facilitating the functionality herein revealed such as both arrangements being fixed conductive magnets 13 or movable conductive magnets 14 in any arrangement or configuration.

Banded battery array 34 is comprised of one or more current sources 1.

Figure 25:
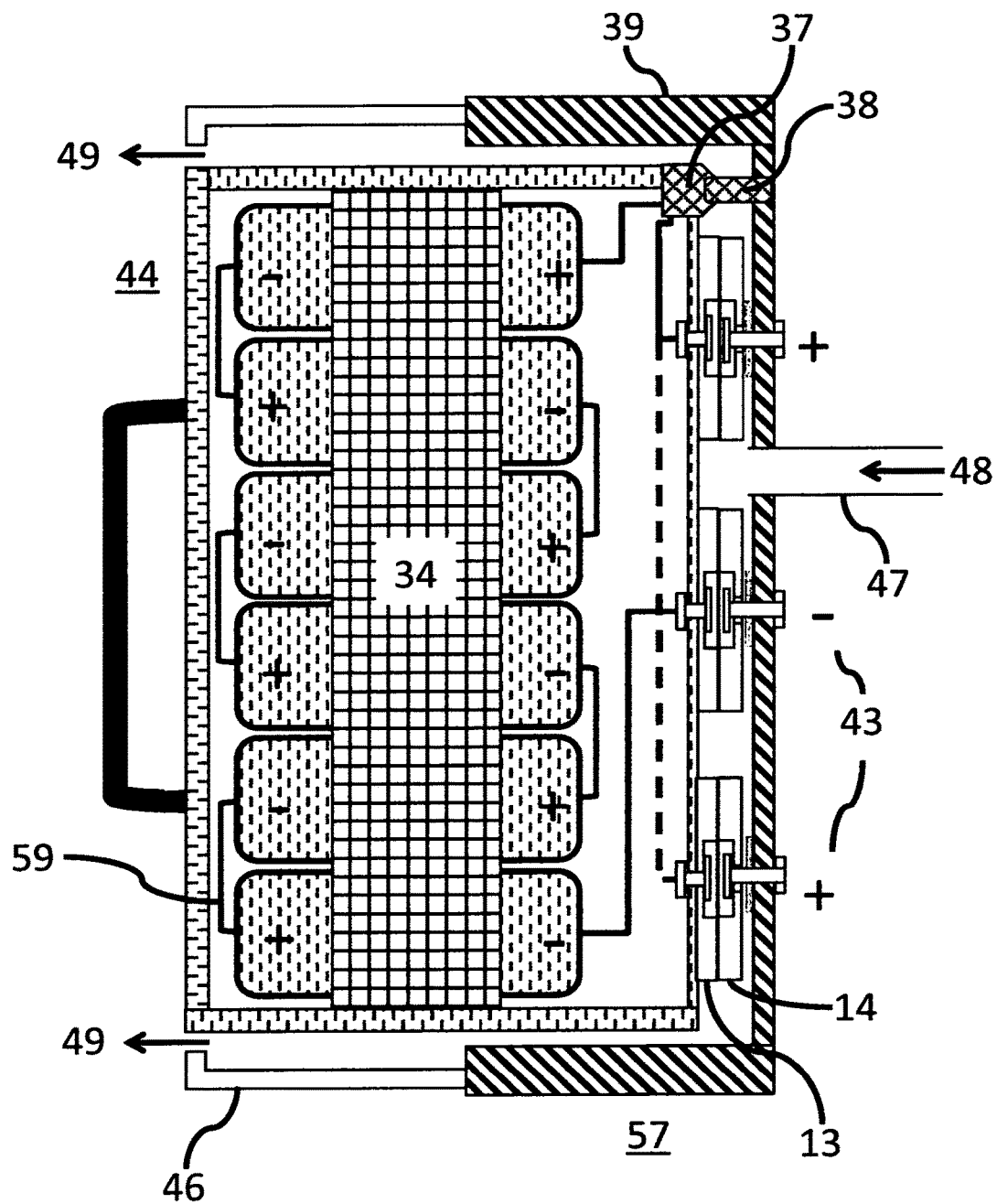
FIG. 25 illustrates the battery power pack assembly inserted into the power pack charger receiver assembly.

FIG. 25 illustrates the battery power pack assembly 44 is inserted into power pack charger receiver 57 configured as a charging receptacle closing the electrical and mechanical connection between fixed conductive magnets 13 and movable conductive magnets 14 and engaging safety switch contactor 38. The safety switch 37 is closed and the fixed conductive magnets 13 are energized, emerging moveable conductive magnets 14 causing electrical potential 43 to appear for the purpose of charging the banded battery array 34.

In some applications the battery power pack may be contaminated in use or during charging or transport. Cleaning gas 48 is flowed through cleaning gas input 47 into and across all surfaces of the battery power pack 44 and exiting from cleaning gas outputs 49. Cleaning gas outputs 49 are around or otherwise configured to surround and contain the battery power pack 44 assuring proper and adequate gas flow, retention and exhaust. Cleaning gas 48 is preferred to be ozone, ionized gas, ethylene oxide, sterilizing gas 8, chlorine, ionized liquid, materials of high or low pH such as a sodium hypochlorite bleach mist or other preferred sterilizing agent, hot air, dry air, room air and any gas or combination of gas. It is a preferred embodiment that an Ultraviolet lamp not shown be integrated into power pack charger receiver 57 to produce ozone and ultraviolet light providing both cleaning and organically sterilizing action while charging or while the battery power pack 44 is inserted. A discharge type ozone generator to produce ozone is a preferred embodiment of the present invention. Flow flaps 46 are preferred to be configured of porous carbon or other material to degrade waste ozone and reduce its entry into the room air when ozone is incorporated.

Battery element connectors 59 are shown connecting the current sources 1 forming the electrical connectivity for banded battery array 34.

Battery power pack receiver alignment guides 39 and flow flaps 46 are preferred to be comprised of clear materials such as plastics and elastomers, and ruggedized by incorporating hardened materials and other material such as metal or stiffened or hardened plastics to perform the required function in a durable and aesthetically pleasing manner.

Conductive magnets may be of any type or combination or connectivity facilitating the functionality herein revealed such as both arrangements being fixed conductive magnets 13 or movable conductive magnets 14 in any arrangement or configuration.

Figure 26:
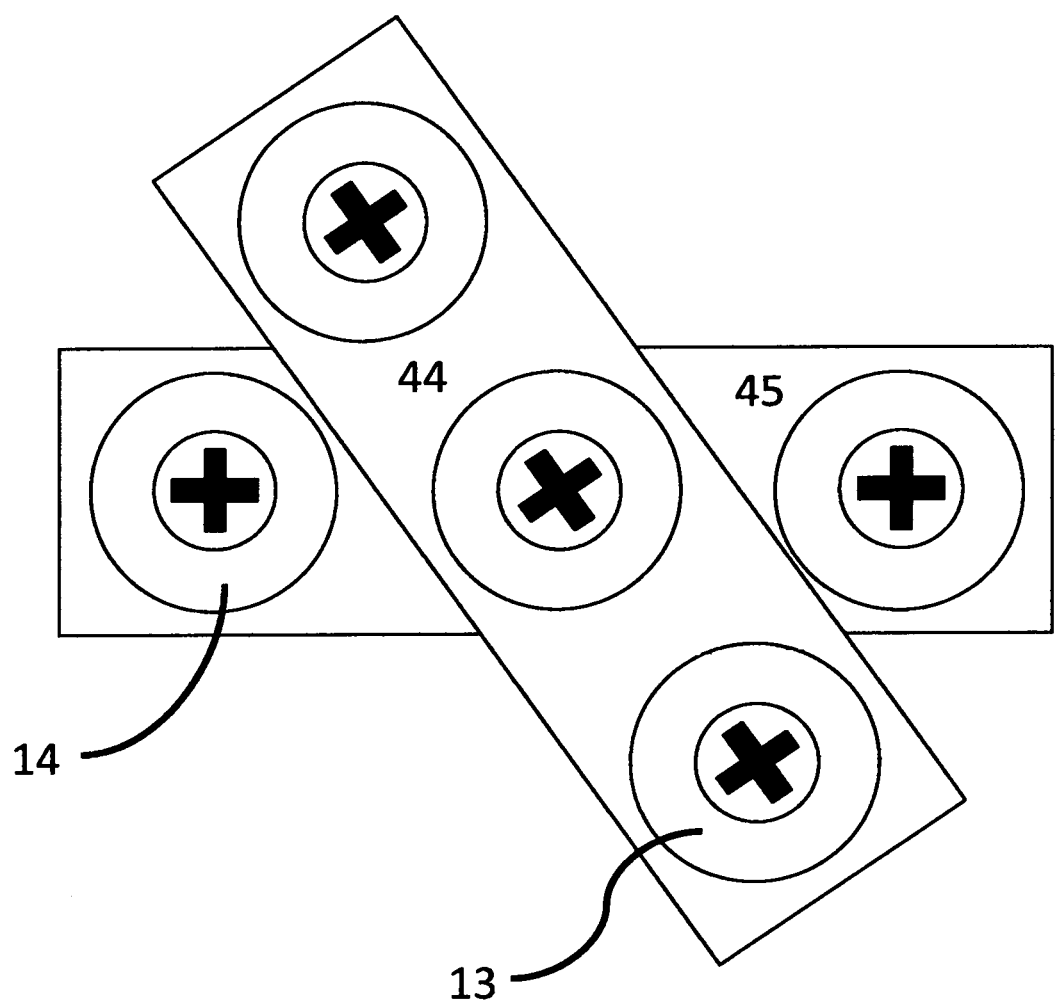
FIG. 26 illustrates battery power pack insertion or removal by turning the battery power pack in relation to the battery power pack receiver.

FIG. 26 illustrates a twist-to-release method of battery power pack removal by turning the battery power pack 44 in relation to the battery power pack receiver 45 causing the fixed and moveable conductive magnets 13 and 14 to slide apart at the outer ends of the battery power pack 44 and the battery power pack receiver 45 decreasing the strength of the magnetic attraction by two thirds in this case facilitating removal of battery power pack 44 by physically pulling away from the battery power pack receiver 45.

Figure 27:
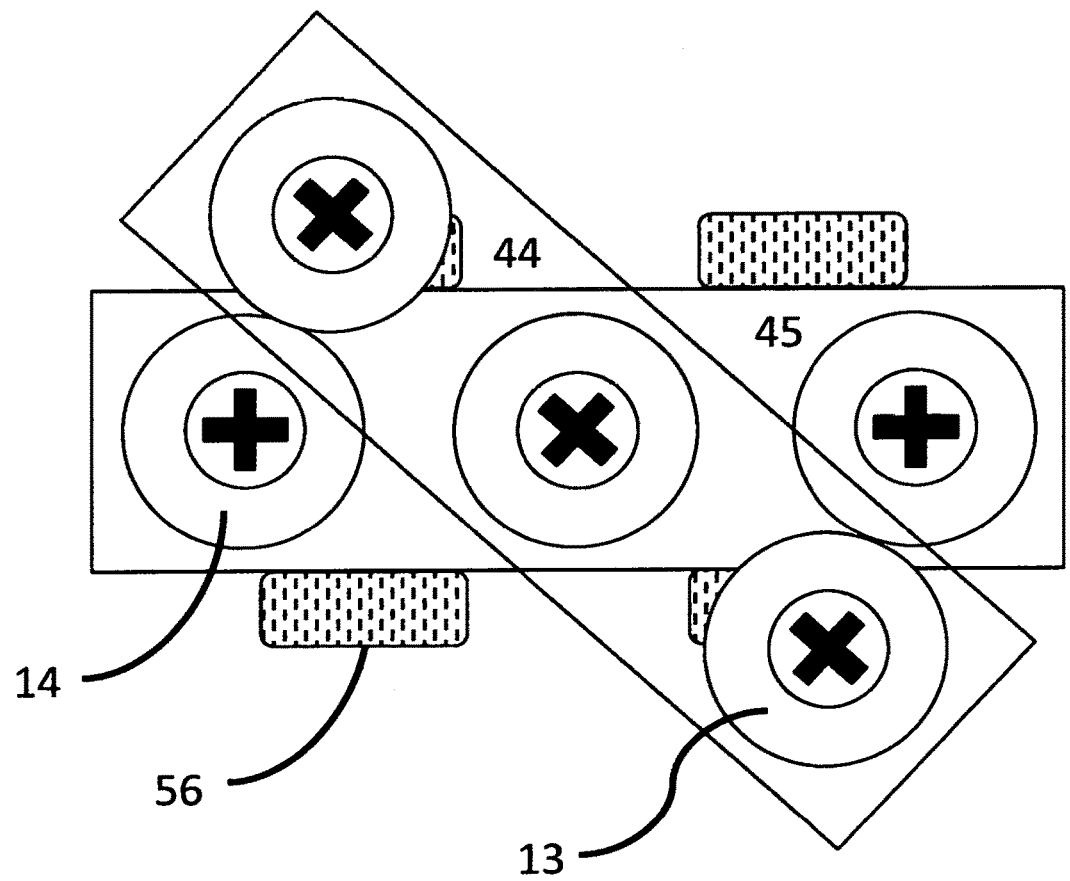
FIG. 27 illustrates a method of battery power pack removal by turning the battery power pack in relation to the battery power pack receiver assisted by the action of removal magnets. The overlaying power pack is illustrated as transparent for clarity.

FIG. 27 illustrates a method of battery power pack removal by turning the battery power pack 44 in relation to the battery power pack receiver 45 causing the fixed and moveable conductive magnets 14 and 13 to slide apart at the outer ends of the battery power pack 44 and the battery power pack receiver 45 decreasing the strength of the magnetic attraction by two thirds in this case facilitating removal of battery power pack 44 by physically pulling away from the battery power pack receiver 45. The force of removal is assisted by the action of conductive magnetic 13 passing over removal magnets 56, four shown to facilitate separation of the shown assemblies in any twisting direction, applying the repulsive magnetic force of conductive magnetics 13 as they pass over removal magnets 56 overcoming the attractive force of the center conductive magnets 13 and 14 pushing the assemblies apart facilitating ease of separation. This twist-to-release method provides for enhanced ease of removal even when vary powerful magnets are utilized and is a preferred embodiment of the present invention. Battery power pack 44 is illustrated as a transparent backplane or structural substrate to more clearly exhibit the relative orientation.

Figure 28:
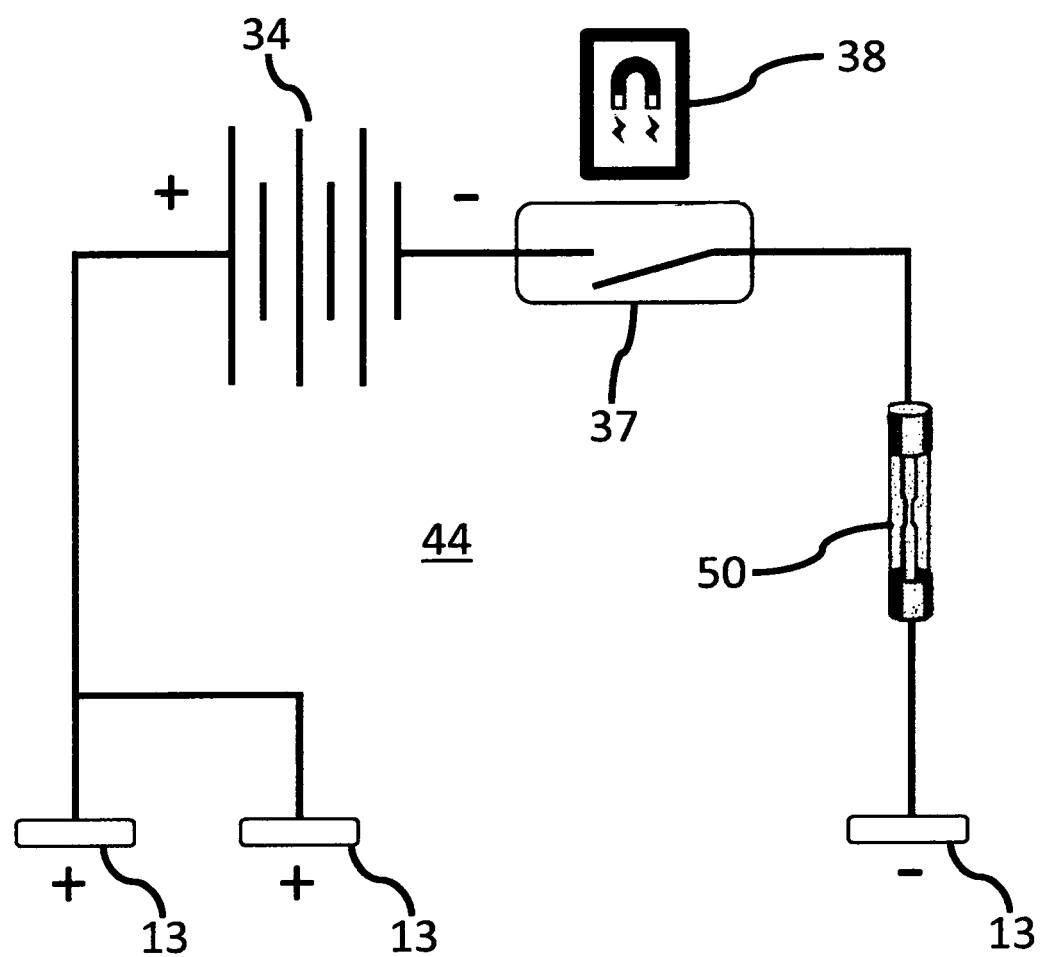
FIG. 28 illustrates a circuit diagram for battery power battery.

FIG. 28 is a circuit diagram for battery power pack 44. Banded battery array 34 is shown directly connected to the positive battery outputs fixed conductive magnets 13. The negative battery output of banded battery array 34 is shown connected to normally open safety switch 37. Normally open safety switch 37 is preferred as a magnetic switch, although any switch type including mechanical is a preferred embodiment of the present invention. Safety switch contactor 38 is not a part of this assembly but is shown for clarity as it is a magnetic source that actuates and closes normally open safety switch 37 when the two are in physical proximity as when the battery power pack 44 is inserted into the battery power pack receiver 45. When normally open safety switch 37 is closed the fixed conductive magnet 13 is connected through fuse 50 expressing the negative battery potential as shown.

Figure 29:
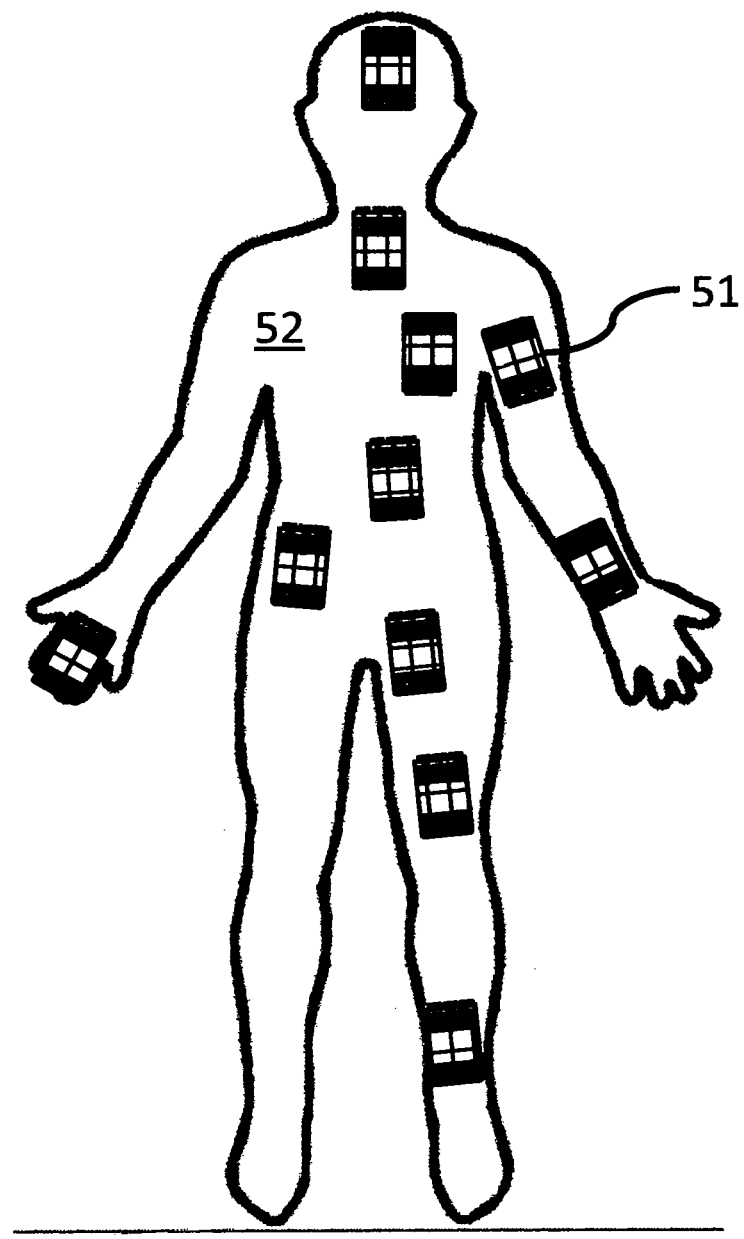
FIG. 29 illustrates example locations of power pack on a human outline.

FIG. 29 illustrates some of the possible locations of floating power pack 51 on human 52. Floating power pack 51 is comprised of battery power pack 44 and battery power pack receiver 45 in any configuration. Many other locations than those indicated are possible and are preferred embodiments of the present invention.

Figure 30:
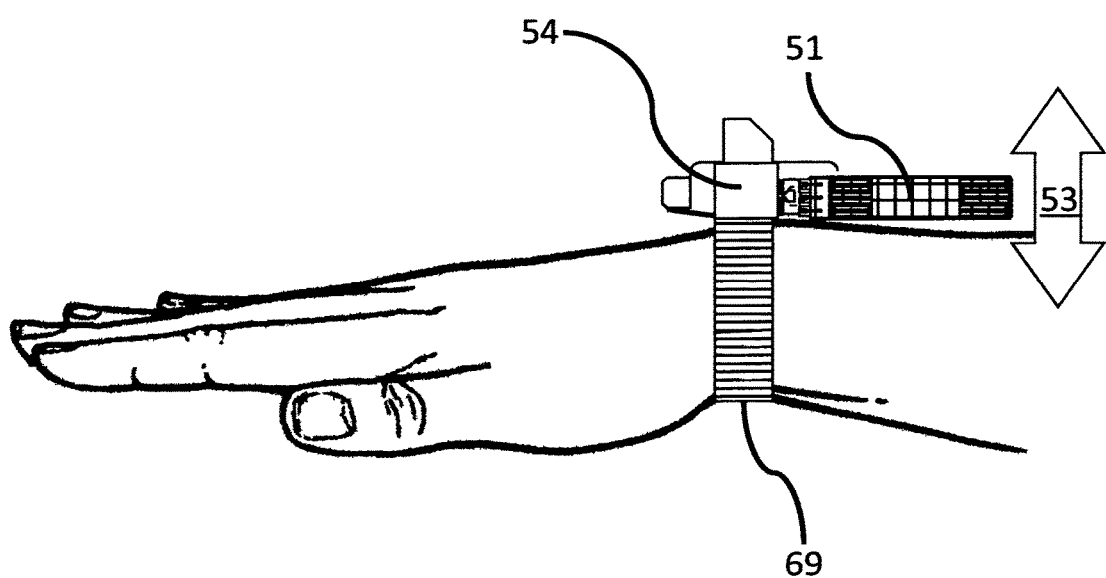
FIG. 30 illustrates the floating power pack integrated into a wrist mounted tool power controller and monitor.

FIG. 30 illustrates the floating power pack 51 integrated into a wrist mounted tool power controller and monitor 54 incorporating battery power pack receiver 45. The motion facilitated by moveable conductive magnets 14 is shown by motion 53. Wrist mounted tool power controller and monitor 54 incorporates a control panel comprising voltage monitoring, low voltage alert, power control and electrical safeties and connections as appropriate to the application. Wrist mounted tool power controller and monitor 54 is preferred constructed of clear plastic, colored but transparent plastic, and structural materials as appropriate to the application. Moveable conductive magnets 14 and the magnets on a wrist mounted tool power controller and monitor 54 supply magnetic energy to the wrist providing magnetic therapy potentially relieving wrist fatigue. The wrist mounted tool power controller and monitor 54 is preferred to regulate voltage and current. Battery power pack receiver 45 is held on the body, as shown here on the wrist, by wrist strap 69.

Figure 31:
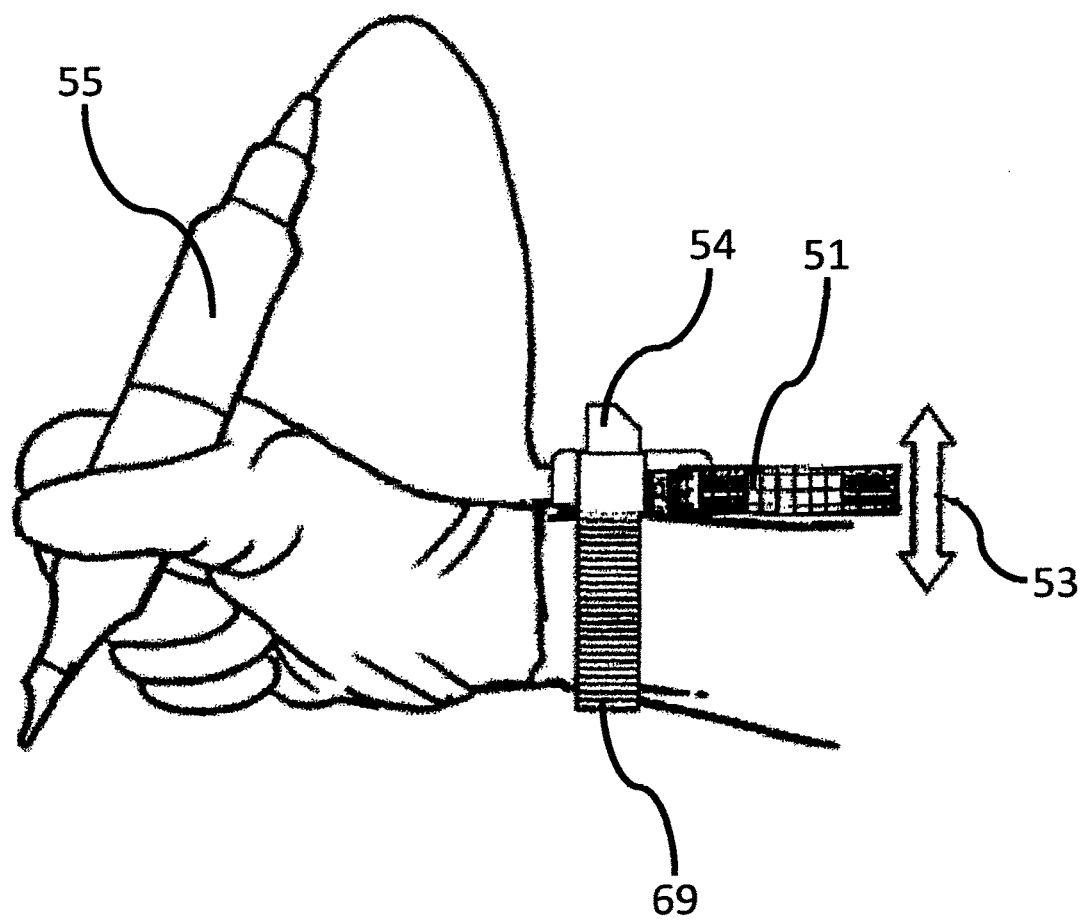
FIG. 31 illustrates a view of the floating power pack integrated into a wrist mounted tool power controller and monitor powering a power tool such as a tattoo machine.

FIG. 31 illustrates a top view of the floating power pack 51 integrated into a wrist mounted tool power controller and monitor 54. Floating battery pack 51 is the assembly of battery power pack 44 and battery power pack receiver 45. The tool 55 as illustrated is a power tool or artistic tool such as a power drill or a tattoo machine. The motion facilitated by moveable conductive magnets 14 is shown by motion 53. Battery power pack receiver 45 is held on the body, as shown here on the wrist, by wrist strap 69.

This present innovation facilitates the seamless "quick switch" of battery packs, providing the tattoo artist an un-tethered "wireless" system to utilize during the process of the tattoo, and adds no significant additional time to the tattoo process.

The motion facilitated by floating battery pack 51 is shown by motion 53. In this manner no addition stress is applied to the battery back 51 by hand or wrist movements during a tattoo session or during the use of a hand tool or most typical hand actions.

Figure 32:
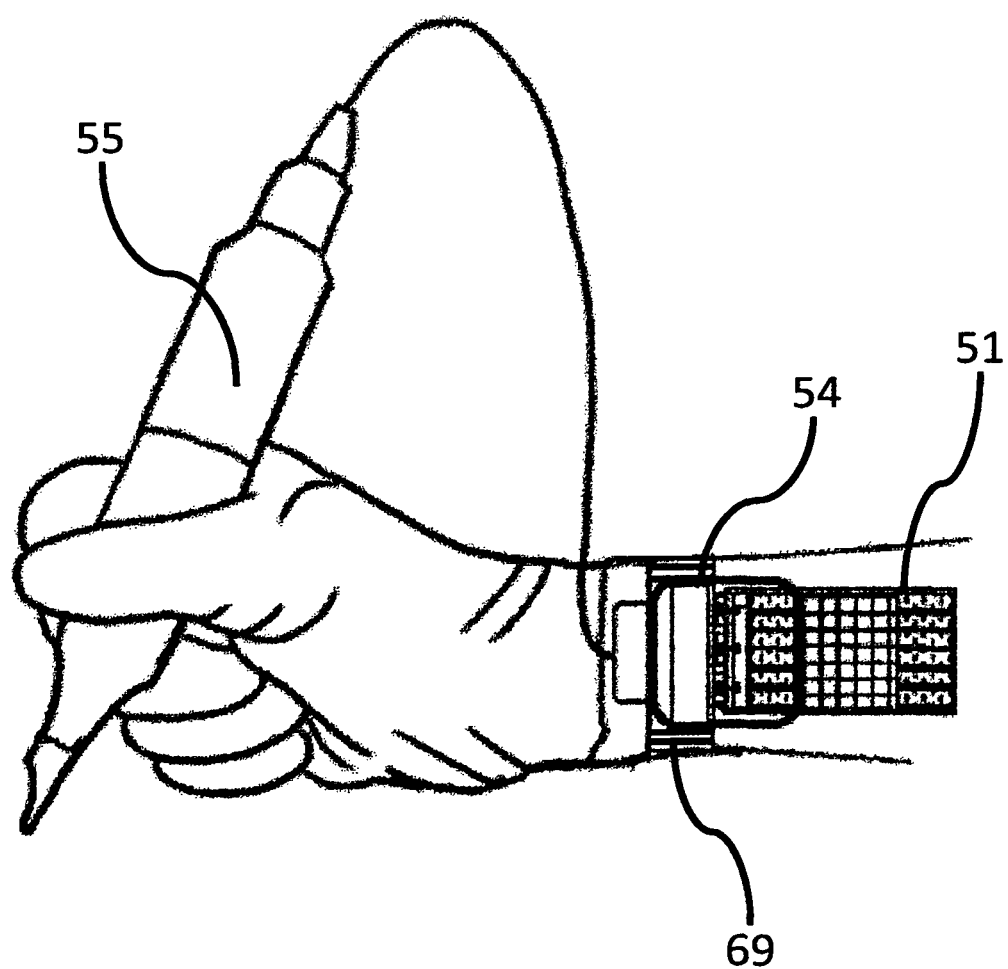
FIG. 32 illustrates another view of the power pack integrated into a wrist mounted tool power controller and monitor powering a tattoo machine.

FIG. 32 illustrates a side view of the floating power pack 51 integrated into a wrist mounted tool power controller and monitor 54. The tool 55 as illustrated is a power tool or artistic tool such as a hand held drill or a tattoo machine.

In the case of a tattoo machine the process involved in utilizing the floating power pack 51 integrated as the power supply for a hand held tattoo machine is procedurally as follows. The tattoo area is prepped normally, a charged power pack 44 is removed from charging power pack charger receiver 57 and inserted into the battery power pack receiver 45 of the wrist mounted tool power controller and monitor 54 connected to the power supply connector of the tattoo machine where it is electrically connected. Magnetic polarities are selected to prevent the possibility of reversing the connection of the battery as per FIG. 25. This step seamlessly integrates into all set up steps with no additional work or delay. Barrier film is then placed over the system comprised of wrist mounted tool power controller and monitor 54 with inserted floating power pack 51 in order to protect it from cross contamination, as would be done with any and all conventional equipment. The tattoo is then started at the artist's leisure.

A voltage control system allows the battery pack to deliver a constant voltage as set by and adjustable by the artist via wrist mounted tool power controller and monitor 54. The artist will take breaks from time to time as needed in order to restock supplies or allow client to relax. The artist can switch the floating power pack 51 by twisting as per FIGS. 27 and 28, and removing the spent power pack 51, immediately replacing it with a charged power pack 51. This action is facilitated by a one-hand operation so as not to disrupt the normal order of activities during the tattoo session. As compared to using conventional equipment the convenient process of switching from an old battery to a fresh one provides a seamless transfer of constant voltage to the artists machine and can be switched as needed without the breaks in tattooing that would otherwise be utilized during such process creating no added delay or inconvenience to the artist or client during the tattoo experience. An LED indicator tells the artist that the battery is connected.

The artist will have a general sense of the floating power pack 51 remaining energy content by visual monitoring of a voltage display in wrist mounted tool power controller and monitor 54 displaying both the voltage level of the battery and the voltage level set to supply the tattoo machine. In this manner the artist can judge the approximate battery life remaining in the battery pack. It is a preferred embodiment of the present invention that a single display be selectable to automatically switch between the voltage level of the battery and the voltage level set to supply the tattoo machine or be selectable to display either the voltage level of the battery or the voltage level set to supply the tattoo machine. Two displays are preferred one continuously displaying the voltage level of the battery and the other the voltage level set to supply the tattoo machine.

An LED indicator light and an audio alarm and an integrated vibration integrated into wrist mounted tool power controller and monitor 54 alerts the artist of a need to "quick switch" the floating power pack 51 when a pre-set voltage level is reached by the power pack 51. This assures the voltage fed to the tattoo machine is constant and will not be interrupted by an overly drained power pack 51. Once the indicator light is seen, the artist will remove the drained battery floating power pack 51 from the wrist mounted tool power controller and monitor 54 connected to the tattoo machine, and switch it with a charged floating power pack 51 from the charging system. The barrier film is easily removed and applied during this time in order to keep all equipment sanitary.

An integrated foot switch is provided to start/stop the tattoo machine via wireless controls mounted in the wrist mounted tool power controller and monitor 54. An on and off switch mounted on the wrist mounted tool power controller and monitor 54 is a preferred embodiment.

This present innovation facilitates the seamless "quick switch" of battery packs, providing the tattoo artist an un-tethered "wireless" system to utilize during the process of the tattoo, and adds no significant additional time to the tattoo process.

The motion facilitated by floating battery pack 51 is shown by motion 53. In this manner no addition stress is applied to the floating power pack 51 by hand or wrist movements during a tattoo session. Battery power pack receiver 45 is held on the body, as shown here on the wrist, by wrist strap 69.

Figure 33:
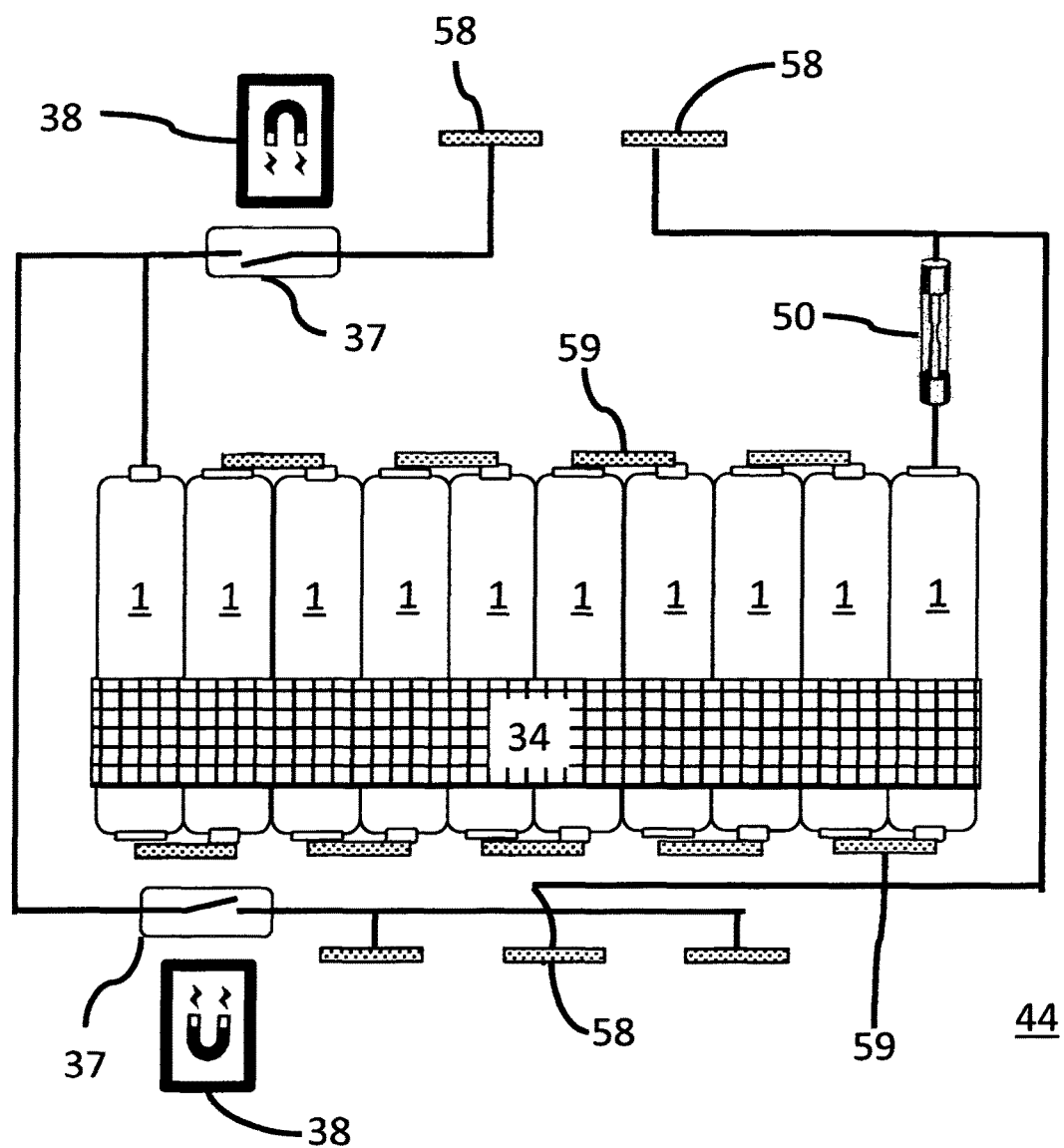
FIG. 33 illustrates a battery power pack with magnetic connectors on each side; both two and three element connectors are shown as examples.

FIG. 33 illustrates the electrical configuration of a battery power pack 44 with fixed or floating or moveable conductive magnets 58 on each side, both two and three element fixed or floating or moveable conductive magnets 58 are shown, though in a typical and preferred application the fixed or floating conductive magnets 58 are the same numeric count on each end of the battery power pack 44. A number of current sources 1 such as batteries are shown; in this case ten are shown for illustration only with any desired number possible from a count of one and up. Fuse 50, safety switch contactor 38 shown as a magnetic source as an example and safety switch 37 in open position shown as a reed switch or similar are shown. Battery element connectors 59 are shown connecting the current sources 1 forming the electrical connectivity for banded battery array 34.

Figure 34:
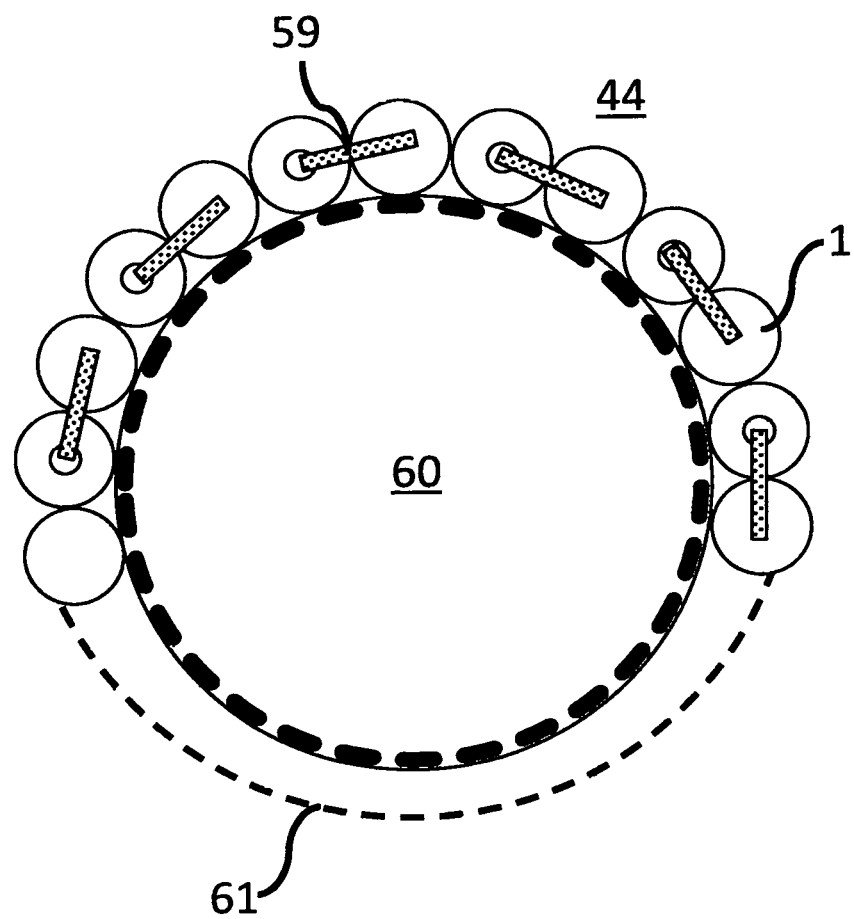
FIG. 34 illustrates a battery power pack that is configured to fit around an arm, wrist, leg or neck.

FIG. 34 illustrates a battery power pack 44 that is configured to fit around an arm, wrist, leg or neck or other appendage 60, and is attached by strap 61. Battery element connectors 59 and current sources 1 are shown for clarity.

Figure 35:
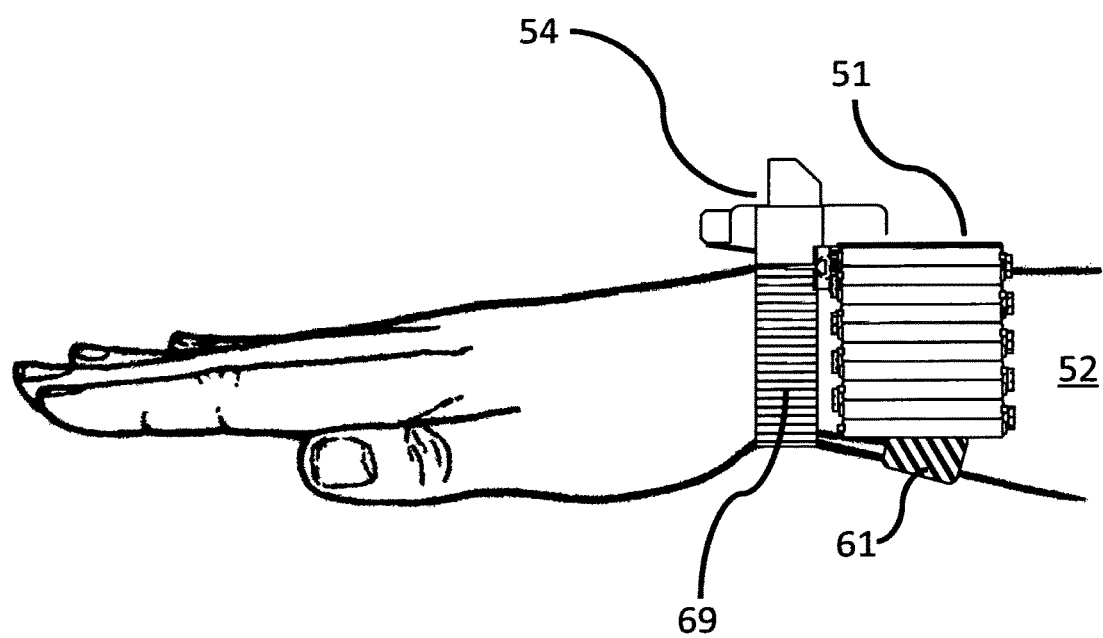
FIG. 35 illustrates a battery power pack configured to fit around a wrist and interface with a wrist mounted tool power controller and monitor.

FIG. 35 illustrates a floating power pack 51 configured to fit around a human 52 wrist bound by strap 61 and interfaced with a wrist mounted tool power controller and monitor 54. Battery power pack receiver 45 is held on the body, as shown here on the wrist, by wrist strap 69. Tool power controller and monitor 54 converts and controls electrical power supplied by floating power pack 51 into direct or alternating electrical voltage and current as required by the powered load.

Figure 36:
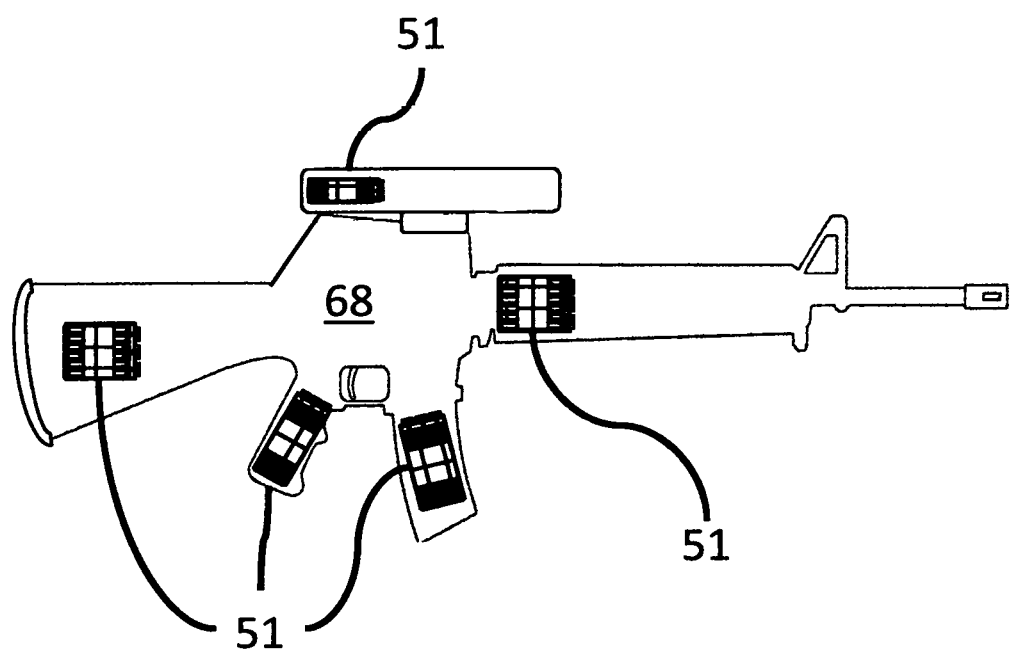
FIG. 36 illustrates the present invention as installed in a weapon requiring battery power that is rapidly replaceable but firmly and reliably connected.

FIG. 36 illustrates the present invention as installed in a weapon 68 requiring battery power that is rapidly replaceable but firmly and reliably connected. Floating power pack 51 is illustrated in various example modes serving any electrical supply function of weapon 68. The weapon 68 as shown includes all guns and projectile devices including lethal and nonlethal. The present invention is applicable to hobby guns such as the Airsoft brand and other electric air guns, and to hunting and military guns with electrical requirements for their various electrical devices.

Figure 37:
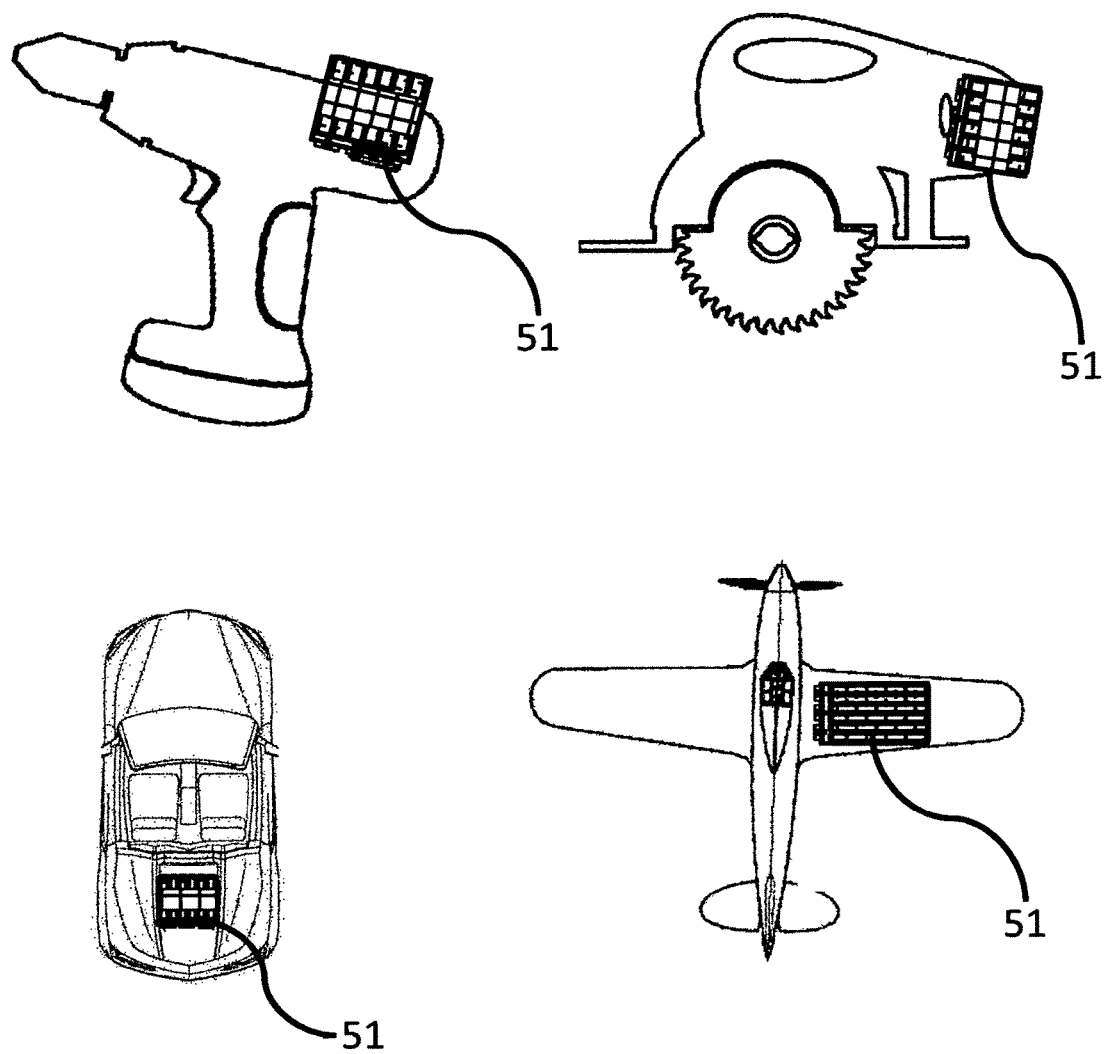
FIG. 37 illustrates the present invention as installed in power tools and various vehicles and toys requiring battery power that is rapidly replaceable but firmly and reliably connected both mechanically and electrically.

FIG. 37 illustrates the present invention as floating power pack 51 installed in power tools and various vehicles and toys requiring battery power that is rapidly replaceable but firmly and reliably connected both mechanically and electrically. Preferred tools are all power tools powered by a battery of any form or type. Preferred vehicles and toys are all toys powered by batteries whether internal or replaceable to include battery powered automotive models and toys, powered and gliding aircraft to include radio controlled airplanes, helicopters, quad copters and any powered aircraft, or combination thereof, aquatic and combination battery powered recreational and toy devices.

Figure 38:
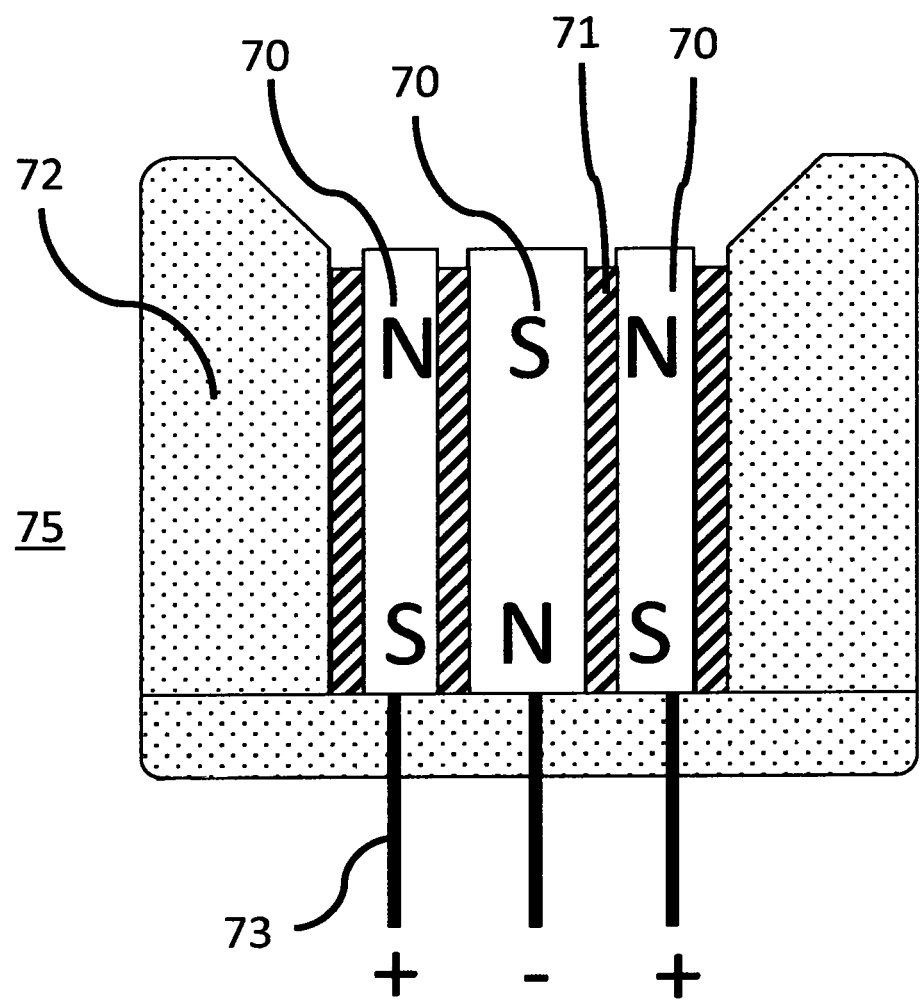
FIG. 38 illustrates the reversible magnetic cable connector shown as a receiving connection coupling floating power pack to the item being supplied electrical current.

FIG. 38 illustrates the reversible magnetic cable connector 75 of the present invention shown as a receiving connection coupling floating power pack 52 not shown to the item being supplied electrical current. Conductively coated magnets 70 are electrically separated by flexible insulators 71. Flexible insulators 71 facilitate motion of conductively coated magnets 70 assuring mechanical contact by facilitating correction of minor misalignments of the reversible magnetic cable connectors when they are brought together assuring an electrically conductive connection. The frame 72 forces mechanical alignment further assuring a correct and desirable alignment of the conductively coated magnets 70. Conductors 73 connect the electrical power to the conductively coated magnets 70. As shown, the electrical polarities are minus on the middle conductor and plus on the outer conductors. These polarity considerations may be selected as needed to facilitate the application, and the magnetic polarities may be selected to facilitate the mechanical connection as desired. The conductively coated magnets 70 protrude or are recessed in frame 72 to facilitate connection.

Figure 39:
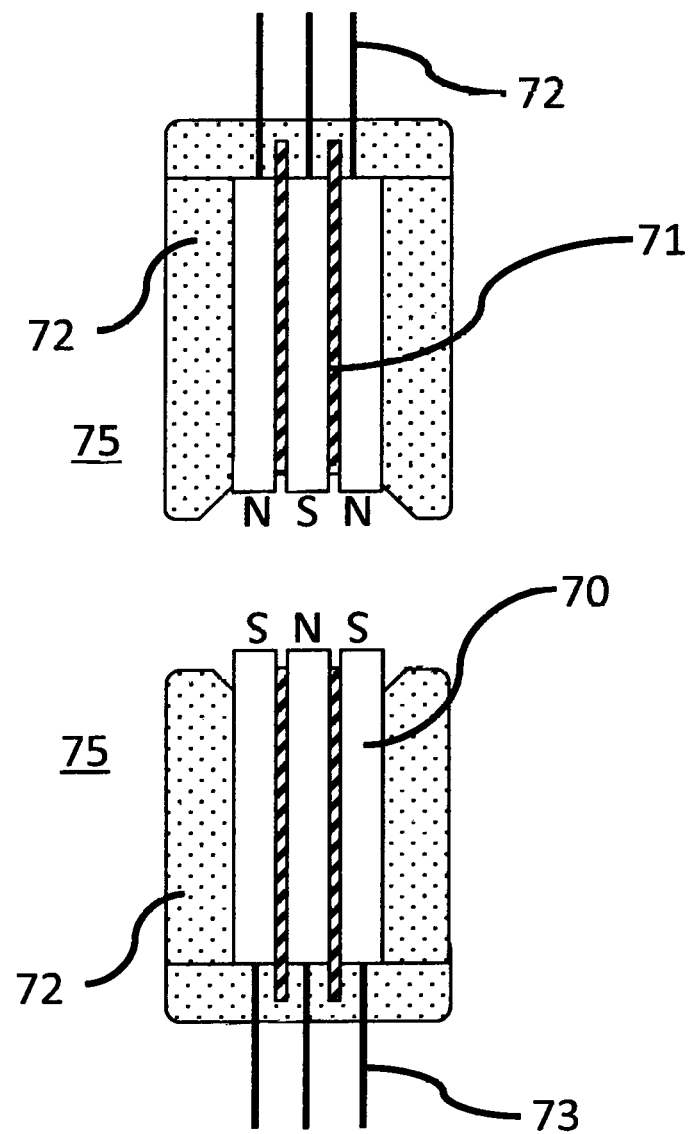
FIG. 39 illustrates the reversible magnetic cable connectors of the present invention shown as both a receiving and inserting connection together forming a connector coupling floating power pack to the item being supplied electrical current.

FIG. 39 illustrates the reversible magnetic cable connectors 75 of the present invention shown as both a receiving and inserting connection together forming a connector coupling floating power pack 52 not shown to the item being supplied electrical current. Conductively coated magnets 70 are electrically separated by flexible insulators 71. Flexible insulators 71 facilitate motion of conductively coated magnets 70 assuring mechanical contact by facilitating correction of minor misalignments of the reversible magnetic cable connectors when they are brought together assuring an electrically conductive connection. The frames 72 force mechanical alignment further assuring a correct and desirable alignment of the conductively coated magnets 70. Conductors 73 connect the electrical power to the coated conductive magnets 70. As shown, the magnetic polarities shown are of opposing polarities to facilitate magnetic mechanical connection facilitating the desired electrical connection. These polarity considerations may be selected as needed to facilitate the application, and the magnetic polarities may be selected to facilitate the mechanical connection as desired.

Figure 40:
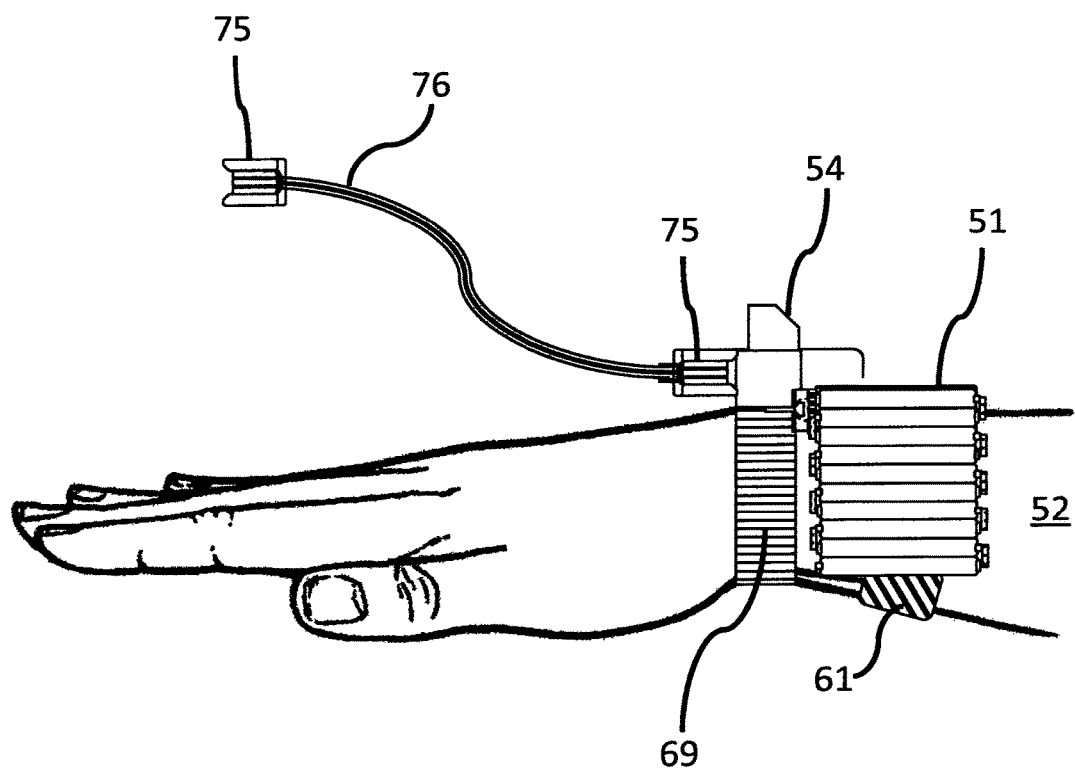
FIG. 40 illustrates a floating power pack configured to fit around a human wrist bound by a strap and interfaced with a wrist mounted tool power controller and monitor.

FIG. 40 illustrates a floating power pack 51 configured to fit around a human 52 wrist bound by strap 61 and interfaced with a wrist mounted tool power controller and monitor 54. Battery power pack receiver 45 is held on the body, as shown here on the wrist, by wrist strap 69. Reversible magnetic cable connector 75 of the present invention shown as a cable receiving connection coupling floating power pack 52 through a wrist mounted tool power controller and monitor 54 to the item being supplied electrical current not shown.

All magnets and magnetic devices and implements in the foregoing description include compositions of all know magnetic materials, and preferably includes materials containing an alloy of neodymium, iron and boron to form the Nd2Fe14B tetragonal crystalline structure commonly referred to as neodymium. It is a preferred embodiment that the electrically conductive properties of neodymium provide significant electrical conductivity and facilitate miniaturization of the device. The magnets are preferred to be covered in a conductive mechanical overcoat.

The terms battery and current source are used interchangeably to facilitate clarity in the various descriptions as appropriate, and conductive coatings are functionally interchangeable with conductive plating or plate, the terms battery and current source are used interchangeably for clarity, and magnets covered in a conductive material include any conductive material.

The spring function as herein described may be one of the many types of spring to include but not limited to coil, leaf, and levered types. Expansive and rebounding plastics and foams, and elastomers of all types providing a spring action are preferred embodiments of the present invention.

While the present invention has been described in terms of various specific embodiments, those skilled in the art will recognize that the invention can be practiced with considerable modification within the spirit and scope of the variations, combinations, and equivalents of the specific embodiment, method, and examples herein revealed. The invention should therefore not be limited by the above described embodiments, but as it is set forth in the claims below.

We claim:

1. An apparatus comprising a reversible magnetically connected battery pack and receiver, the battery pack and receiver comprising:

a battery pack further comprising one or a plurality of batteries, the battery pack being in a housing, said housing comprising a mounting surface and three electrically conductive magnets attached to the housing in a linear fashion and in a straight line, each electrically conductive magnet with a conduction lead attached to one pole of the battery pack, the outside electrically conductive magnets attached to one electrical pole of the battery pack and the center electrically conductive magnet attached to the opposite pole of the battery pack, the battery pack being physically reversible without changing the positions of the electrical poles, the battery pack comprising a safety switch to energize the one or more batteries and magnets when inserted and the battery pack being supported by mechanical action of the magnets; and a reversible magnetically connectable battery pack receiver comprising three moveable conductive magnets, the moveable conductive magnets mounting having limited mechanical motion;

wherein the electrical and mechanical connection of the battery pack by the moveable conductive magnets is made through the battery pack receiver; and wherein the battery pack receiver incorporates a tool power controller and monitor to a hand tool, wherein the hand tool is one of a power tool, a tattoo machine, electrical tool, electric toy, an artistic tool, a weapon, or an electronic device of a type requiring portable electrical power.

2. The apparatus of claim 1 wherein the electrical connection of the tool to the battery pack receiver is comprised of a conductive reversible magnetic cable connector.

3. The apparatus of claim 1 wherein the battery pack, battery pack receiver, and tool power controller and monitor are mountable on the hand tool, on or in a body, or on or in clothing.

4. The apparatus of claim 1 further incorporating twist to release action relieving magnetic connection facilitated by magnetically repelling removal magnets.

5. The apparatus of claim 1 further incorporating an integrated foot switch controlling the flow of electrical current to the hand tool via wired or wireless controls mounted in the battery pack receiver.

6. The battery pack receiver apparatus of claim 1 receiving electrical power from the battery pack and providing that electrical power to a tool.

7. The apparatus of claim 1 wherein the conductive magnets of the reversible magnetically connectable battery pack receiver are aligned in a straight line.

8. The apparatus of claim 1 wherein the conductive magnets are encased in a conductive structural overcoat.

9. The apparatus of claim 1 wherein multiple separate electrical conduction paths are provided on electrically insulated connective structures of the moveable conductive magnets.

10. The apparatus of claim 1 wherein the battery pack is configured to receive electrical power from the battery pack, provide user control of the supplied power, regulating and conditioning the supplied power, display the electrical characteristics of the supplied power to the user, and supply the regulated and conditioned electrical power to a tool.

11. The method of forming a reversible magnetically connected battery pack and receiver, wherein the battery pack and receiver comprises:

a battery pack comprising one or a plurality of batteries, the battery pack being in a housing, said housing comprising a mounting surface, three electrically conductive magnets attached to the housing in a linear fashion and in a straight line, each electrically conductive magnet with a conduction lead attached to one pole of the battery pack, the outside electrically conductive magnets attached to one electrical pole of the battery pack and the center electrically conductive magnet attached to the opposite pole of the battery pack, the battery pack being geometrically reversible without changing the positions of the electrical poles, the battery pack comprising a safety switch to energize the batteries and magnets when inserted, and the battery pack being supported by mechanical action of the magnets; and a reversible magnetically connectable battery pack receiver comprising three moveable conductive magnets, the movable conductive magnets mounting having limited mechanical motion; the method comprising:

making the electrical and mechanical connection of the battery pack to the battery pack receiver by the moveable conductive magnets to the electrically conductive magnets; and incorporating by the battery pack receiver a tool power controller and monitor to a hand tool, wherein the hand tool is one of a power tool, a tattoo machine, electrical tool, electric toy, an artistic tool, a weapon, or an electronic device of a type requiring portable electrical power.

12. The method of claim 11 wherein the electrical connection of the tool to the battery pack receiver is comprised of a conductive reversible magnetic cable connector.

13. The method of claim 11 wherein the battery pack, battery pack receiver, and tool power controller and monitor are mountable on the hand tool, on or in a body, or on or in clothing.

14. The method of claim 11 further comprising facilitating twist to release action relieving magnetic connection by the action of magnetically repelling removal magnets.

15. The method of claim 11 further comprising a controlling the flow of electrical current to the hand tool by a remote switch via wired or wireless control mounted in the battery pack receiver.

16. The method of claim 11 further comprising conducting electrical power from the battery pack and providing that that electrical power to the hand tool.

17. The method of claim 11 wherein the conductive magnets of the reversible magnetically connectable battery pack receiver are aligned in a straight line.

18. The method of claim 11 wherein the conductive magnets are encased in a conductive structural overcoat.

19. The method of claim 11 wherein multiple separate electrical conduction paths separate electrically insulated connective structures of the moveable conductive magnets.

20. The method of claim 11 further comprising receiving electrical power from the battery pack, providing user control of the supplied power, regulating and conditioning the supplied power, displaying the electrical characteristics of the supplied power to the user, and supplying the regulated and conditioned electrical power to a hand tool or device.

* * * * *